(12) United States Patent
Pilawa-Podgurski et al.

(10) Patent No.: US 12,738,841 B2
(45) Date of Patent: Sep. 15, 2026

(54) MULTI-PHASE HYBRID POWER CONVERTER ARCHITECTURE WITH LARGE CONVERSION RATIOS

(71) Applicant: THE REGENTS OF THE UNIVERSITY OF CALIFORNIA, Oakland, CA (US)

(72) Inventors: Robert Pilawa-Podgurski, Alameda, CA (US); Zichao Ye, Santa Clara, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 196 days.

(21) Appl. No.: 18/502,585

(22) Filed: Nov. 6, 2023

(65) Prior Publication Data

US 2024/0146188 A1 May 2, 2024

Related U.S. Application Data

(63) Continuation of application No. PCT/US2022/028838, filed on May 11, 2022.

(Continued)

(51) Int. Cl.

*H02M 3/07* (2006.01)
*H02M 1/00* (2006.01)
*H02M 3/158* (2006.01)

(52) U.S. Cl.

CPC ............. *H02M 3/07* (2013.01); *H02M 1/007* (2021.05); *H02M 1/0095* (2021.05); *H02M 3/158* (2013.01)

(58) Field of Classification Search

CPC ...... H02M 1/007; H02M 1/0095; H02M 3/07; H02M 3/158

See application file for complete search history.

(56) References Cited

U.S. PATENT DOCUMENTS

| | | | | |
|---|---|---|---|---|
| 10,693,387 B2 * | 6/2020 | Nakahata | ................ | H02M 5/06 |
| 11,664,727 B2 * | 5/2023 | Giuliano | ............... | H02M 3/073 323/267 |

(Continued)

OTHER PUBLICATIONS

ISA/US, United States Patent and Trademark Office, International Search Report and Written Opinion issued Sep. 1, 2022, related PCT international application No. PCT/US2022/028838, p. 1-, with claims searched, pp.

(Continued)

*Primary Examiner* — Gary L Laxton
(74) *Attorney, Agent, or Firm* — O'BANION & RITCHEY LLP; John P. O'Banion

(57) ABSTRACT

A multi-phase hybrid power converter architecture which provides high efficiency, high power density and high conversion ratios for non-isolated DC to DC power conversion. Hybrid converters are described in which a switched-capacitor network is interoperably merged with a switched-inductor network having multiple inductors, resulting in a circuit with reduced component count and in which soft-charging of the capacitors is performed. Multi-phase switching is utilized and includes a freewheeling state for output voltage regulation in which inductor current ramps down. The SC converter can be configured to provide various conversion ratios, such as 4-to-1, 6-to-1 and 8-to-1, and optimized for the needs of specific application.

20 Claims, 17 Drawing Sheets

Related U.S. Application Data

(60) Provisional application No. 63/187,540, filed on May 12, 2021.

(56) References Cited

U.S. PATENT DOCUMENTS

| | | | | |
|---|---|---|---|---|
| 11,764,669 | B2 * | 9/2023 | Chen | H02M 3/04 323/282 |
| 2008/0239772 | A1 | 10/2008 | Oraw | |
| 2009/0278520 | A1 * | 11/2009 | Perreault | H02M 3/07 323/282 |
| 2014/0184189 | A1 | 7/2014 | Salem | |
| 2015/0097546 | A1 | 4/2015 | Pan | |
| 2019/0273436 | A1 | 9/2019 | Tang | |
| 2020/0212795 | A1 * | 7/2020 | Das | H02M 3/07 |
| 2020/0328680 | A1 | 10/2020 | Giuliano | |

OTHER PUBLICATIONS

Ye, Zichao, et al., "MLB-PoL: A High Performance Hybrid Converter for Direct 48 V to Point-of-Load Applications", 2020 IEEE 21st Workshop on Control and Modeling for Power Electronics (COMPEL). IEEE, 2020, pp. 1-8.

Ye, Zichao, et al., "A 48-to-6 V Multi-Resonant-Doubler Switched-Capacitor Converter for Data Center Applications," 2020 IEEE Applied Power Electronics Conference and Exposition (APEC), New Orleans, LA, USA, 2020, pp. 475-481.

Miftakhutdinov, Rais "Improving System Efficiency with a New Intermediate-Bus Architecture," in Texas Instruments Inc. Seminar, 2009, pp. 4-1 to 4-20.

Texas Instruments, LMG5200POLEVM-10 User's Guide, 2017.

Bel Fuse Inc. , 48 V-TO-POL Power Stamp datasheet, 2020. [Online]. Available: https://belfuse.com/resources/datasheets/ powersolutions/ds-BPS-48-V-to-POL-power-stamp.pdf.

Vicor Inc., Factorized Power Architecture and VI Chips White Paper, 2013. [Online]. Available: http://www.vicorpower.com/ documents/ whitepapers/fpa101.pdf.

Ahmed, Mohamed H. Ey Al., "Single-stage high-efficiency 48/1 v sigma converter with integrated magnetics", IEEE Transactions on Industrial Electronics, vol. 67, No. 1, Jan. 1, 2020, pp. 192-202.

Baek, Jaeil, et al. "Lego-pol: 48v-1.5v 300a merged-two-stage hybrid converter for ultra-high-current microprocessors," in 2020 IEEE Applied Power Electronics Conference and Exposition (APEC), 2020, pp. 490-497.

Das, Ratul, et al. "An 80-w 94.6%-efficient multi-phase multi-inductor hybrid converter," in 2019 IEEE Applied Power Electronics Conference and Exposition (APEC), 2019, pp. 25-29.

Halamicek, Michael, et al., "Cross-coupled series-capacitor quadruple step-down buck converter", 2020 IEEE Applied Power Electronics Conference and Exposition (APEC), 2020, pp. 1-6.

Seeman, Michael D. et al. "Analysis and optimization of switched-capacitor dc-dc converters," IEEE Transactions on Power Electronics, vol. 23, No. 2, Mar. 2008, pp. 841-851.

Lei, Yutian et al., "A general method for analyzing resonant and soft-charging operation of switched-capacitor converters", IEEE Transactions on Power Electronics, vol. 30, No. 10, Oct. 2015, pp. 5650-5664.

Pilawa-Podgurski, Robert C. N., et al. "Merged two-stage power converter architecture with soft charging switched-capacitor energy transfer," in 2008 IEEE Power Electronics Specialists Conference, Jun. 2008, pp. 4008-4015.

Lidow, Alex, "Powering graphics processors from a 48-v bus", [Online]. Available: https://www.powerelectronictips.com/powering-graphics-processors-from-a-48-v-bus/, Mar. 4, 2019, pp. 1-18.

Ahmed, Mohamed, et al., "Two-stage 48v vrm with intermediate bus voltage optimization for data centers," IEEE Journal of Emerging and Selected Topics in Power Electronics, Feb. 2021, pp. 1-14.

Meynard, T. A. et al., "Multi-level conversion: high voltage choppers and voltage-source inverters", PESC '92 Record. 23rd Annual IEEE Power Electronics Specialists Conference, Toledo, Spain, vol. 1, 1992, doi: 10.1109/PESC.1992.254717, pp. 397-403.

* cited by examiner 760
762
764
766
768
770
772

MULTI-PHASE HYBRID POWER CONVERTER ARCHITECTURE WITH LARGE CONVERSION RATIOS

CROSS-REFERENCE TO RELATED APPLICATIONS

This application claims priority to, and is a 35 U.S.C. § 111(a) continuation of, PCT international application number PCT/US2022/028838 filed on May 11, 2022, incorporated herein by reference in its entirety, which claims priority to, and the benefit of, U.S. provisional patent application Ser. No. 63/187,540 filed on May 12, 2021, incorporated herein by reference in its entirety. Priority is claimed to each of the foregoing applications.

The above-referenced PCT international application was published as PCT International Publication No. WO 2022/241035 A1 on Nov. 17, 2022, which publication is incorporated herein by reference in its entirety.

STATEMENT REGARDING FEDERALLY SPONSORED RESEARCH OR DEVELOPMENT

This invention was made with Government support under DE-AR0000906, awarded by DOE Advanced Research Projects Agency—Energy. The Government has certain rights in the invention.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to power conversion circuits, and more particularly to a multi-phase hybrid power converter for providing large conversion ratios.

2. Background Discussion

The power consumption of data centers is continuously growing, as a result of pervasive advancement of computer science applications (e.g., machine learning, artificial intelligence) and lifestyle changes. It is therefore important to improve system efficiency of data centers, from both economic and environment perspectives.

Accordingly, a need exists for improved power conversion circuitry. The present disclosure fulfills that need and provides additional advantages.

BRIEF SUMMARY

Advanced power converter topologies and control techniques are described which can substantially improve the efficiency and power density of non-isolated DC to DC power conversion, especially when large voltage conversion ratios are necessary. In the hybrid converter topologies described in the present disclosure, a switched-capacitor network is interoperably merged with a switched-inductor network, resulting in a circuit with reduced component count and capacitor soft-charging.

This disclosure also describes a multi-phase control technique to achieve higher conversion ratios for the switched-capacitor network, which can further improve overall system efficiency without increasing component count or circuit size.

Power converters based on the technology can be adopted to improve the energy efficiency of data centers. Data centers are a fast growing area of technology whose contributions can provide significant positive impacts both economically and environmentally. Examples of use cases include, but are not limited to data center power delivery (e.g., supporting power demands of machine learning, IoT, and so forth); all-electric and hybrid vehicles (e.g., bridging between 400V battery bus voltage and 48V subsystems); portable electronics (e.g., enable more efficient and faster wired/wireless charging); and solar photovoltaics (e.g., improving conversion efficiency between panel and grid).

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

1. Introduction

Figure 1:
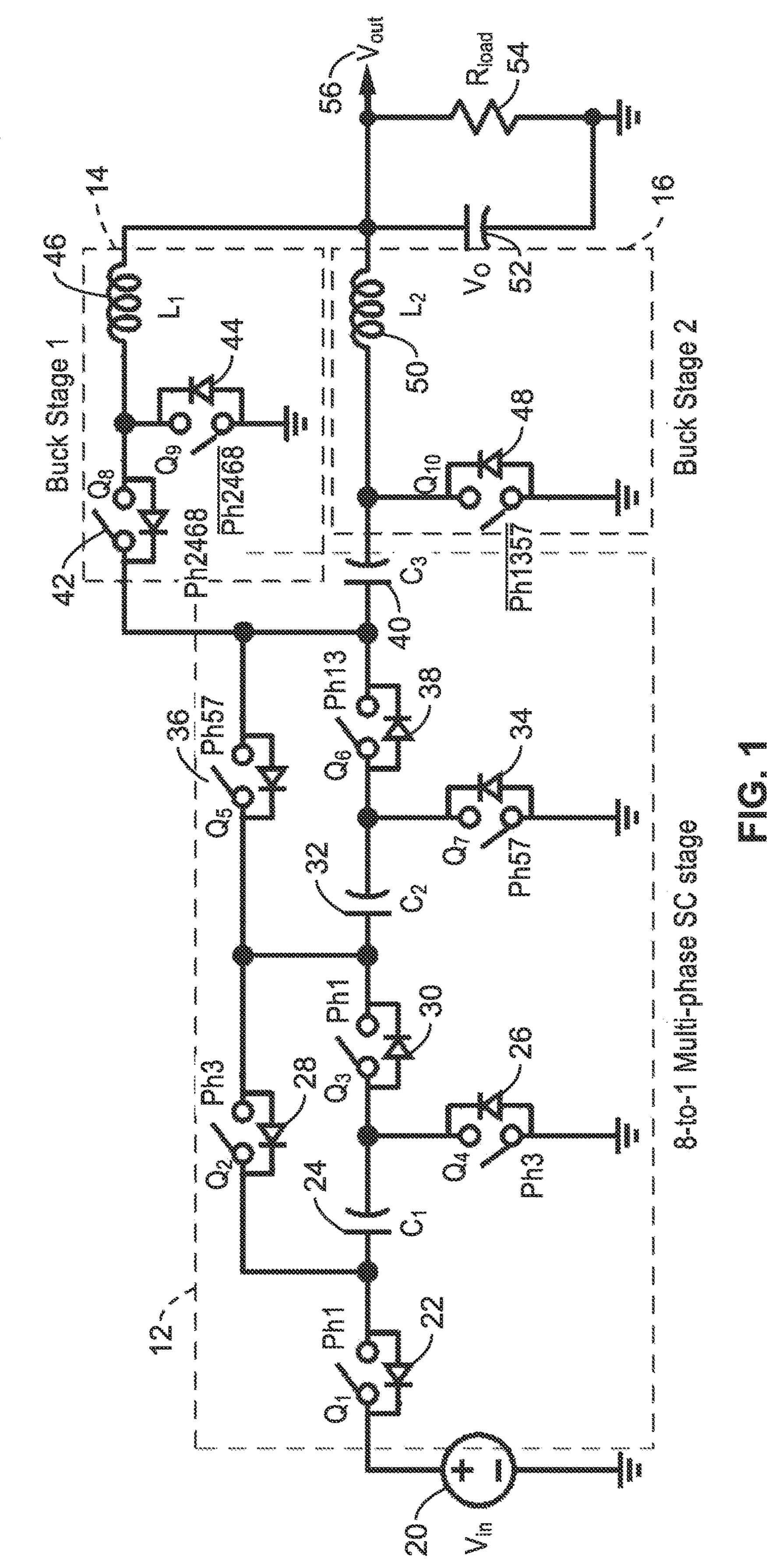
FIG. 1 is a schematic diagram of an embodiment of an 8-to-1 hybrid converter according to at least one embodiment of the present disclosure.

A multi-phase hybrid power converter architecture is described in which a switched-capacitor network is merged with a switched-inductor network, resulting in circuit component number reductions and soft-charging capacitor operation. In addition, a multi-phase control technique is utilized for achieving higher conversion ratios for the switched-capacitor network, toward further improving overall system efficiency without increasing circuit size.

In terms of data center power delivery, the intermediate bus architecture (IBA) has been generally adopted owing to its high efficiency, flexibility, and reduced cost. By distributing power at higher server input voltages (e.g., 48 Volts as compared to conventional 12 Volts), cabling and bus bar conduction losses can be significantly reduced. A major challenge in such systems is the conversion from the 48 Volt bus to the extreme low voltage and high current operating levels of CPUs and GPUs. To address such a high conversion ratio, a two-stage approach has been commonly utilized. The 48V is first converted to an intermediate bus voltage (e.g., 12V) through a bus converter, then stepped down to 1-2V by point-of-load (PoL) converters. However, studies of direct 48V to PoL conversion have shown promise to improve overall efficiency, power density and reduced system cost. For such high conversion ratios, a transformer-based converter has been commonly used; however, this approach unavoidably requires a level of trade-off between conversion efficiency and voltage regulation range. To address this challenge, the high step-down and regulation requirements can be split between a highly efficient fixed-ratio LLC converter and an upstream buck-boost converter or a series-stacked buck converter with partial power processing.

In addition to transformer-based solutions, hybrid converters comprising multi-phase buck converters merged with a fixed-ratio switched-capacitor (SC) converter, have also shown attractive features for direct 48V to PoL conversion. Similar to transformers, SC converters also have excellent performance at fixed-ratio conversions, largely due to their efficient utilization of active and passive components.

2. Advantages when Combining Buck and SC Stages

By combining the buck and the SC stages, the total number of components (e.g., switches and decoupling capacitors) can be reduced compared to the use of cascaded two-stage solutions. More importantly, the inductor of the buck converter can greatly reduce or eliminate the capacitor charge sharing loss of the SC converter through soft-charging operation, toward obtaining a very efficient fixed-ratio conversion in the SC stage. However, due to the fact that the circuit complexity of SC converters increases in proportion to the conversion ratio, the SC stage in the majority of existing hybrid converters can only achieve a conversion ratio of 4-to-1 or 6-to-1, with the remaining conversion burden placed on the buck stage. Given a fixed output voltage, the efficiency of a buck converter generally decreases with increasing input voltage. If the first stage SC converter can achieve a higher conversion ratio without significant extra loss, the input voltage of the buck converter can be decreased, and the overall 48V-to-PoL efficiency can be improved.

3. Benefits of Multi-Phasic Operations

One of the principal aspects of the present disclosure is a conversion network with merged multi-phase switched-capacitance (SC) and switched-inductance (SL). As a context, the following are some characteristics of these multi-phase SC networks If SC is merged with SL, yet only two operating phases/states are utilized then the achievable voltage gain of the SC stage is bounded by a "Fibonacci" limit. For instance, with 1 flying capacitor the maximum voltage gain from the SC stage is 2; with 2 flying capacitors the maximum gain is 3; with 3 flying capacitors the maximum gain is 5. One characteristic of an SC network with two operating phases is that each capacitor in the SC network is charged in one phase and discharged in the other phase. Intuitively, the voltage gain is achieved by voltage addition/subtraction of neighboring capacitors. Thus, the limit of the gain follows a Fibonacci pattern.

In contrast, by adopting the disclosed multi-phase SC network the present disclosure can obtain higher voltage gain with the same number of components at the SC stage; for example, using 2 flying capacitors for a gain of 4, or using 3 flying capacitors for a gain of 6 or 8.

One of the characteristics of the disclosed SC networks having multiple operating phases is that the capacitors can have multiple charging and discharging states, while having the ability to be disconnected in other states. In this way, the disclosed conversion network seamlessly merges the operation of a cascade of basic SC networks. For instance, the use of multi-phase operation, allows cascading two 2-to-1 SC converters and allowing them to operate as a single converter, for a total gain of 4. Another example would be cascading a 2-to-1 SC with a 3-to-1 series-parallel SC, to obtain a total voltage conversion ratio of 6 (i.e., the 6-to-1 example in FIG. 3). If three 2-to-1 SC converters are cascaded, then a total voltage conversion ratio of 8 (i.e., the 8-to-1 example in FIG. 1) is obtained.

To maintain flying capacitor charge balance, the capacitors with lower voltage ratings are configured to conduct for longer time periods than those capacitors with higher voltage ratings.

With multi-phase operation, the voltage conversion ratio of the SC stage is bounded by 2^n, where n is the number of flying capacitors. It should be appreciated that this voltage conversion ratio represents a significant increase over the Fibonacci limit of a two-phase SC network.

Compared to a two-phase SC, one of the key benefits of a multi-phase SC is to provide a higher voltage conversion ratios given the same number of components; or alternatively the use of fewer components to obtain the same voltage conversion ratio.

By adopting this "multiple operating phase" concept to the merged SC and SL hybrid converter for high-conversion-ratio applications can provide unique advantages. Given a similar/identical total voltage gain (Gain_tot=Gain_SC×Gain_SL) and limited space/number of components of the SC stage, multi-phase operation can provide a higher voltage conversion ratio at the SC stage, and thus allow reducing the required voltage gain at the SL stage (i.e., the buck stage, which is usually less efficient than the SC stage). This can potentially lead to better overall efficiency and power density.

4. Embodiments of Multi-Phase SC Converters

The multi-phase SC network is generic in nature and can have different variants; with the following general properties.

(A) The circuitry always starts with a 2-to-1 front-end stage (four switches rated at 0.5Vin and one flying capacitor rated at $0.5V_{in}$). Then different common SC topologies can be cascaded from there. In the 6-to-1 example, the 2-to-1 front-end stage is followed by a 3-to-1 series-parallel stage, thereby a total voltage conversion ratio of 6 is provided at the SC stage (6=2×3). In the 8-to-1 example, the 2-to-1 front-end stage is followed by another two 2-to-1 SC stages, thereby providing a total voltage conversion ratio of 8 at the SC stage (8=2×2×2). Alternatively, an 8-to-1 ratio can also be achieved by cascading the 2-to-1 front-end stage with a 4-to-1 series-parallel stage (8=2×4). In this disclosure, the examples mainly utilize the 2-to-1 "doubler" SC and "series-parallel" switched-capacitor (SC) topologies as examples; however, the disclosed converters are not limited to these topologies, as SC topologies such as the "Dickson" SC and others, can also be utilized without limitation.

(B) For an N-to-1 multi-phase SC network, there are N operating phases. The duration of each operating phase is T/N, where T is the time of a switching period. The very first flying capacitor (with the highest voltage rating) in the 2-to-1 front-end stage, charges in one operating phase/state and discharges in another. The next flying capacitor(s) in the following stage conducts for a doubled amount of time; for example, charging in two operating phases/states (by the very first flying capacitor), and discharges in another two operating phases/states. The same trend continues for the later stages in the cascade.

(C) Following the N-to-1 fixed ratio SC network, a switched-inductor (SL) based "buck" stage is introduced to form a hybrid SC-SL converter. Each buck stage consists of two series-connected switches (i.e., in a half-bridge configuration) and an inductor connected in the middle of the two switches. (e.g., $Q_8$, $Q_9$, and $L_1$ in FIG. 1). For the buck stage that is connected to the negative (output side) terminal of a flying capacitor, the high-side switch in the half-bridge can be omitted; whereby that buck stage only requires one switch and one inductor (e.g., $Q_{10}$, $L_2$ in FIG. 1).

There are two main benefits of adding the inductive "buck" stage. (1) Continuous voltage gain/regulation can be achieved. (2) The output inductor in the buck stage can improve the efficiency of the SC stage by facilitating capacitor soft-charging operations. It will be noted that "soft-charging" is inherently supported by the disclosed hybrid SC-SL converters.

The maximum number of output inductors is N, such as in the buck stage, and is equal to the conversion ratio of the multi-phase SC stage. The number of output inductors can also be configured to N/2. In this case, the effective operating frequency of each inductor is doubled compared to the fundamental switching frequency of the front-end 2-to-1 SC stage (e.g., the 6-to-1 example in FIG. 3).

This trend can continue to further reduce the inductor number to N/4, if N/4 remains an even number. In this case, the effective operating frequency of each inductor is quadrupled compared to the fundamental switching frequency of the front-end 2-to-1 SC stage (e.g., the 8-to-1 example in FIG. 1).

For the 8-to-1 example, the hybrid topology can have different numbers of output inductors; for example, 8 or 4 or 2 output inductors.

From a circuit perspective, the minimum number of output inductors is determined by the number of voltage nodes in the SC network that can generate a desired voltage level of $V_{in}/N$. For the 6-to-1 example, the hybrid topology can have 6 or 3 output inductors. For the additional 4-to-1 example it can have 4 or 2 inductors.

Compared to the N-to-1 multi-phase SC network, the final hybrid topology with the merged SL network has an additional "freewheeling" state after each of the N main operating phases/states. During this state, the "non-output" side of all inductors are connected to ground.

(D) The total conversion ratio (voltage gain) of the hybrid converter is the product of the SC stage gain (conversion ratio) and the SL stage gain (Gain_tot=Gain_SC×Gain_SL). The SC stage conversion ratio is fixed and equal to N. The SL (buck) stage conversion ratio is adjustable by the duty cycle D. D is the duration (time period) that the inductor is connected to its high-voltage level (Vin/N) within a switching period.

(E) The phasing of the control signals (a.k.a., the PWM signals) is configured so that all flying capacitors can maintain charge balance at their nominal voltages, and all inductors are energized/de-energized in an interleaving fashion with symmetrical phase shifts.

(F) The disclosed multi-phase hybrid converter architecture can be implemented with several variations. As examples, an 8-to-1 (e.g., 8-to-1 denotes the conversion ratio of the SC network) version is described and a 6-to-1 version. By way of example and not limitation, in one example embodiment, the 8-to-1 version uses 10 switches, 3 flying capacitors and 2 inductors. In one embodiment, the 6-to-1 version uses 11 switches, 3 flying capacitors and 3 inductors. Given more components, the architecture can be extended, and more topology variations can be obtained.

For the sake of simplicity of illustration, the embodiments describe an input at the left proceeding to the output at the right of each schematic. However, it should be appreciated that the depicted topologies themselves are bidirectional in nature, and can also be used for step-up applications ($V_{out}$ higher than $V_{in}$), instead of step-down application, by simply swapping the input and output terminals.

FIG. 1 illustrates an example embodiment 10 of an 8-to-1 hybrid converter, shown with an 8-to-1 multi-phase SC stage 12 followed by multiple parallel buck stages, herein exemplified as a first buck stage 14 and a second buck stage 16. The figure also depicts operating phases of the associated switches. as described below.

Figure 2:
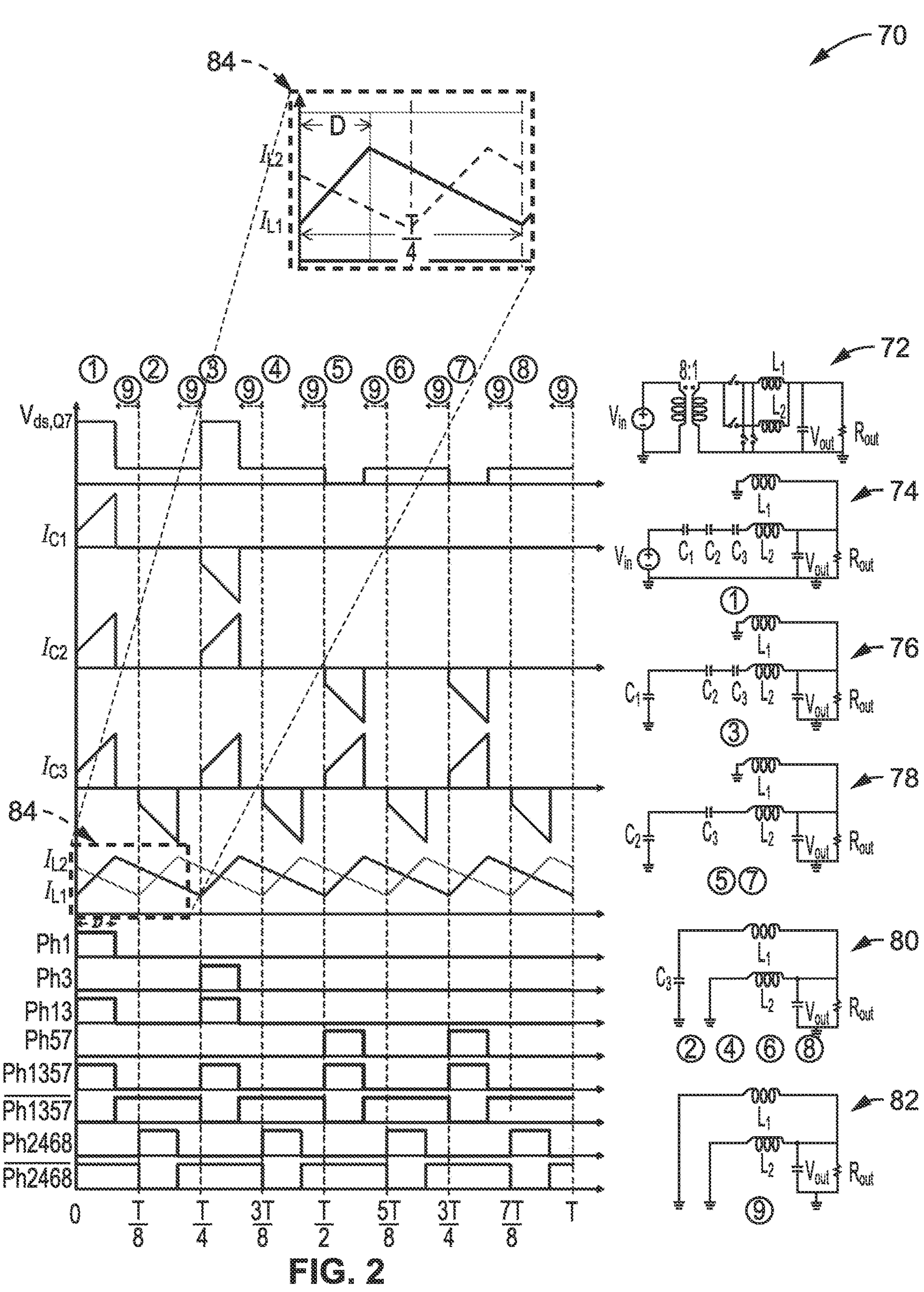
FIG. 2 are waveforms of voltage, current and PWM waveforms of the converter of FIG. 1 and equivalent circuit models of different operating phases, as utilized according to at least one embodiment of the present disclosure.

FIG. 2 illustrates an example embodiment 70 of voltage, current, and PWM waveforms for the converter of FIG. 1, as well as equivalent circuit models 72 for the overall circuit, circuit 74 for Phase 1 (Ph1), circuit 76 for Phase 3 (Ph3), circuit 78 for Phases 5 and 7 (Ph57), circuit 80 for Phases 2, 4, 6 and 8 (Ph2467), and circuit 82 for Phase 9 (Ph9). A detail 84 is shown of the Inductor currents for $I_{L1}$ and $I_{L2}$ in which width D can only be a maximum of 0.5 of its equivalent switching period of T/4. The converter can be viewed as an 8-to-1 SC converter merged with a two-phase interleaved buck converter.

Considering the circuit and waveforms of FIG. 1 and FIG. 2, the circuit employs multiple operating phases within each switching cycle. Compared with typical SC converters that have two operating phases, this multi-phase SC converter can achieve the same conversion ratio with significantly fewer switches and flying capacitors. The SC stage in the topology is an 8-to-1 multi-phase voltage doubler, which is one practical circuit implementation that achieves the theoretical maximum gain for an 8-to-1 SC converter (i.e., 10 switches and 3 capacitors). The flying capacitors carry binary voltages: $C_1=\frac{1}{2}V_{in}$, $C_2=\frac{1}{4}V_{in}$ and $C_3=\frac{1}{8}V_{in}$, as do the switches: $Q_{1-4}=\frac{1}{2}V_{in}$, $Q_{5-8}=\frac{1}{4}V_{in}$ and $Q_{9-10}=\frac{1}{8}V_{in}$.

By way of example and not limitation, the switches in many of these figures are represented with body diodes which are an inherent part of many solid state switches implemented with transistors, such as MOSFET or other FET switches. In the present disclosure, various forms of switches, capacitors and inductors may be utilized across a wide range of applications without departing from the teachings of the present invention. It should be also appreciated that the recitation of a capacitor value (e.g., $C_1$, $C_2$, $C_3$ and so forth) does not imply that this comprises a single physical capacitor as multiple physical capacitors are often coupled together (e.g., series, or parallel, or a series-parallel combination) to create a given topological capacitance value and voltage limit. In a similar manner, a given topological inductor value may be attained by connecting multiple physical inductors (e.g., series, or parallel, or a series-parallel combination).

In the circuit shown, an input power source 20 with voltage $V_{in}$ is supplied on a first direct (through) path to a first switch 22 ($Q_1$) of a series switching paths for the flying capacitors 24, 32 and 40 (as $C_1$, $C_2$ and $C_3$). This first direct (through) series path is shown with switch 22 ($Q_1$) (controlled by Ph1) to capacitor 24 ($C_1$), then through switch 30 ($Q_3$) (controlled by Ph1) to capacitor 32 ($C_2$), then through switch 38 ($Q_6$) (controlled by Ph13). The direct path can be altered as follows. A second path segment arises when switches 26 and 28 ($Q_4$)($Q_2$) are active (controlled by Ph3) to bypass capacitor 24 ($C_1$). Similarly, a third path segment arises when switch 34 ($Q_7$) and 36 ($Q_5$) (controlled by Ph57) are active to bypass capacitor $C_2$.

It will be noted that in this disclosure, the entire last section of the converter may be termed a buck section, such as comprising multiple buck stages. In this example, a first buck stage 14 is shown coupled for receiving its input preceding the final capacitor 40 through series switch 42 (controlled by Ph2468) to inductor 46 ($L_1$). A grounding switch 44 (controlled by an inverted Ph2468) is connected between switch 42 and inductor 46. A second buck stage 16 is shown coupled after capacitor 40 to inductor 50 ($L_2$), with a grounding switch 48 (controlled by an inverted Ph1357) connected preceding inductor 50.

Outputs from both buck stages are shown coupled together as output 56 shown coupled to output capacitance ($V_o$) 52 and a resistive load ($R_{load}$) 54.

To maintain flying capacitor charge balance in multiphase SC converters, the lower voltage capacitors are charged/discharged for more time (longer duration) than the higher voltage capacitors. In the embodiment described, in order to merge the operation of the SC stage with the buck stage, the charge/discharge cycles of $C_2$ and $C_3$ are divided into multiple phases. As shown in FIG. 2, $C_1$ is charged in Ph1 and discharged in Ph3, $C_2$ is charged in Ph13, and discharged in Ph57, whereas $C_3$ is charged in Ph1357 and discharged in Ph2468.

It should be noted that the operation of the two-phase interleaved buck stage is merged with the SC stage without the need of additional switching. This disclosed merging can aid in reducing conduction losses when compared to a two-stage approach in which the buck converter is directly cascaded with a SC converter. The two inductors are energized (i.e., current ramping up) alternately: with $L_1$ energized by $C_3$ during phases 2, 4, 6, 8 (Ph2468); and $L_2$ energized by the series combination of the flying capacitors during phases 1, 3, 5, 7 (Ph1357). Phase 9 (Ph9) is a freewheeling state for output voltage regulation where the current in both inductors ramps down. There is an inherent current balancing mechanism between the two inductors. If $I_{L1}$ is higher and over-discharges $C_3$, the switch node voltage of $L_2$ will then become higher, inducing a higher $I_{L2}$ that can charge $C_3$ back to its nominal value.

This topology also benefits from an inductor frequency multiplication effect similar to that of a Flying-Capacitor Multilevel (FCML) converter. Defining $f_0$ as the switching frequency of $C_1$ and the associated switches $Q_{1-4}$, then $C_2$ and $Q_{5-7}$ operate at $2f_0$ and $C_3$, $Q_{8-10}$, and $L_{1-2}$ operate at $4f_0$. It should be noted that out of the three switches operating at $4f_0$, only $Q_8$ is hard switched at $V_{in}/4$, while $Q_9$ and $Q_{10}$ operate with zero-voltage switching (ZVS). In addition, the higher voltage rated switches operate at a lower frequency toward reducing switching loss. This feature thus supports inductor size reductions without increasing the frequency of all switches, particularly those with higher voltage ratings. In order to derive an output voltage expression, a value "D" is defined as the duty cycle of signal Ph1 as shown in FIG. 2. The output voltage expression can then be expressed by combining the conversion ratio of the fixed-ratio SC stage and the conversion ratio of the buck stage:

$V\_out=V\_in \cdot 1/8 \cdot 4D=(DV\_in)/2.$

As it is regulated with a duty cycle, the converter can share the same control circuit techniques as that of conventional buck converters. It should be appreciated that the maximum value of D is limited by the length of each operating phase to ⅛. Thus, the highest output voltage of the described embodiment of the converter is $V_{in}/16$. With a 48V input, the maximum output voltage at no-load condition is 3 V, making it incapable of supplying loads at 3.3 V. This reduced output range is a trade-off compared to other hybrid topologies with 4-to-1 or 6-to-1 SC stages. Nevertheless, if a lower output voltage is desired, the converter with its 8-to-1 SC stage has the potential to achieve improved performance in comparison to the 4-to-1 and 6-to-1 topologies, as its buck stage is subject to reduced levels of voltage stress.

A 48 V to 2.5-1.0 V converter prototype with 65 A output current was built and tested. In performing a 48 Volt to 2 Volt conversion, the prototype achieved 95.1% peak efficiency (94.3% including gate drive loss) and 395 Watts/inch 3 power density, demonstrating one of the best in-class performances.

Figure 3:
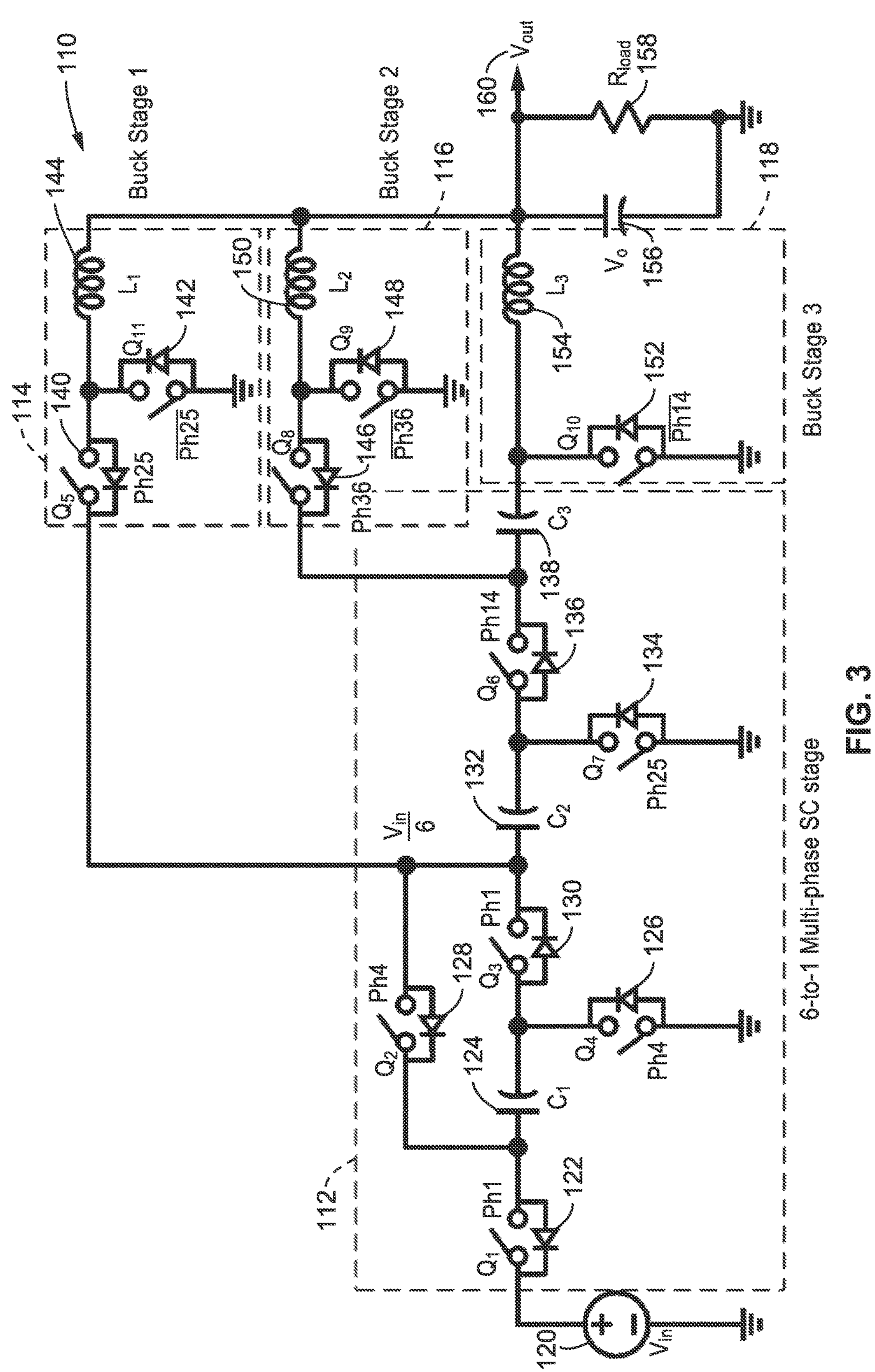
FIG. 3 is a schematic diagram of a 6-to-1 hybrid converter according to at least one embodiment of the present disclosure.

FIG. 3 illustrates an example embodiment 110 of a 6-to-1 version of the hybrid architecture, having a 6-to-1 multi-phase SC stage 112 and three buck stages 114, 116 and 118. This circuit topology can be derived from the 8-to-1 topology, by disconnecting the source terminal of $Q_5$ from $Q_8$, then attaching an additional switch and inductor to it. Now the SC network can be viewed as a 2-to-1 stage cascaded with a 3-to-1 series-parallel stage, with a total SC conversion ratio of 6-to-1. Inductor $L_1$ and $L_2$ are energized by $C_2$ and $C_3$ at phase 2,5 (Ph25) and phase 3,6 (Ph36), respectively. Inductor $L_3$ is energized by the series combination of $C_1$, $C_2$ and $C_3$ at phases 1,4 (Ph14). The three-phase interleaved inductor currents also benefit from the automatic current sharing mechanism as that in the 8-to-1 version. Similarly, the high-voltage switches $Q_{1-4}$ only need to switch at half of the switching frequency as that of the other components. The output voltage can be controlled by the duty cycle D: $V\_out=V\_in \cdot 1/6 \cdot 2D=(DV\_in)/3$, where the maximum D is ⅙.

In the circuit as shown, an input power source 120 with voltage Vin is directed on a direct (through) path through first switch 122 ($Q_1$) (controlled by Ph1) to capacitor 124 ($C_1$) then through switch 130 ($Q_3$) (controlled by Ph1) to capacitor 132 ($C_2$) then through switch 136 ($Q_6$) (controlled by Ph14) to capacitor 138 ($C_3$). The direct path can be altered as follows. A second path segment arises when switches 126 ($Q_4$) and 128 ($Q_2$) (controlled by Ph4) are active which then bypasses capacitor 124 (C1). In addition, switch 134 ($Q_7$) (controlled by Ph 25) can ground the output of capacitor $C_2$.

Multiple buck stages are utilized. A first buck stage 114 is shown, having its input coupled preceding capacitor 132 ($C_2$), then through series switch 140 ($Q_5$) (controlled by Ph25) to inductor 144 ($L_1$). A grounding switch 142 ($Q_{11}$) (controlled by an inverted Ph25) is connected between switch 140 ($Q_5$) to inductor 144 ($L_1$), and to the output. A second buck stage 116 is shown with its input coupled to the input of capacitor 138 ($C_3$), then through switch 146 ($Q_8$) (controlled by Ph36), to inductor 150 ($L_2$). A grounding switch 148 ($Q_9$) (controlled by inverted Ph36) is connected preceding inductor 150 ($L_2$). A third buck stage 118 is shown coupled after capacitor 138 ($C_3$) to inductor 154 ($L_3$), with a grounding switch 152 (controlled by an inverted Ph14) connected preceding inductor 154.

Outputs from all three buck stages are shown coupled together as output $V_{out}$ 160 shown coupled to output capacitance 156 and a resistive load ($R_{load}$) 158.

Figure 4:
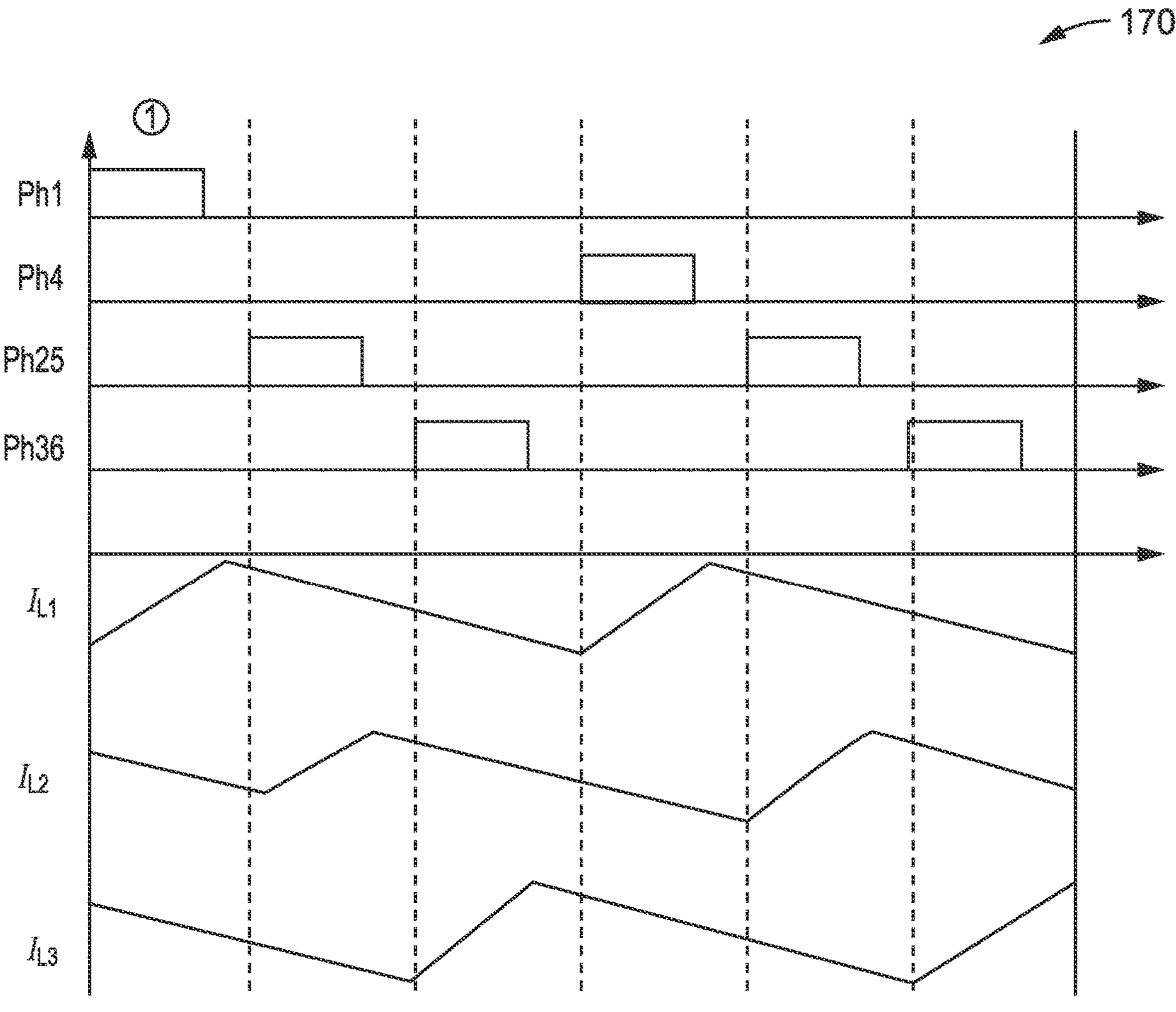
FIG. 4 are waveform plots for the 6-to-1 converter of FIG. 3, as utilized according to at least one embodiment of the present disclosure.

FIG. 4 illustrates an example embodiment 170 of the waveforms for the 6-to-1 hybrid converter of FIG. 3. The figure depicts phases Ph1, Ph4, Ph25, and Ph36, as well as inductor currents $I_{L1}$, $I_{L2}$, and $I_{L3}$.

It should be noted that this 6-to-1 example with three inductors illustrates that the number of output inductors can also be configured to N/2. In this case, the effective operating frequency of each inductor is doubled compared to the fundamental switching frequency of the front-end 2-to-1 SC stage (e.g., the 6-to-1 example in FIG. 3).

Figure 5:
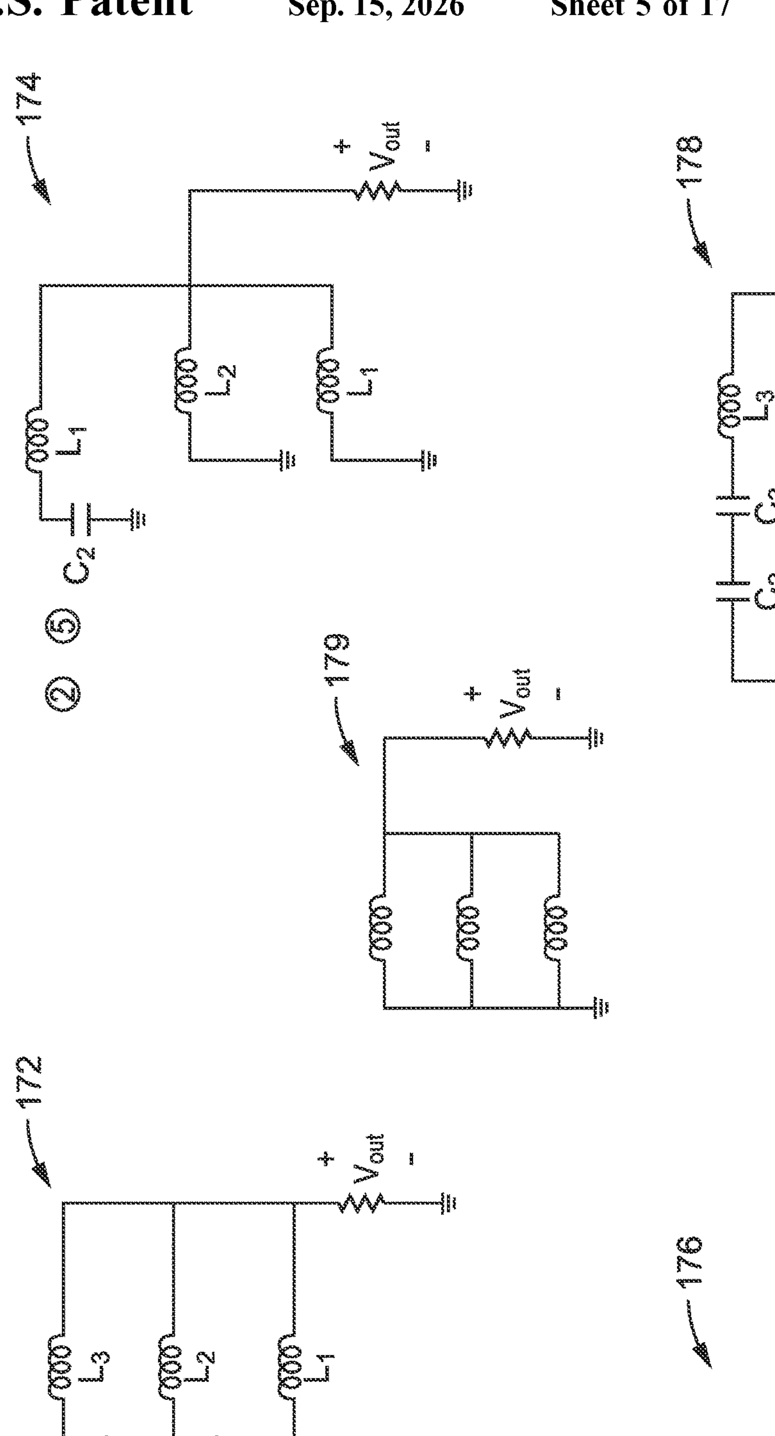
FIG. 5 are equivalent circuit schematics for phases of the 6-to-1 converter of FIG. 3, as utilized according to at least one embodiment of the present disclosure.
Figure 5:
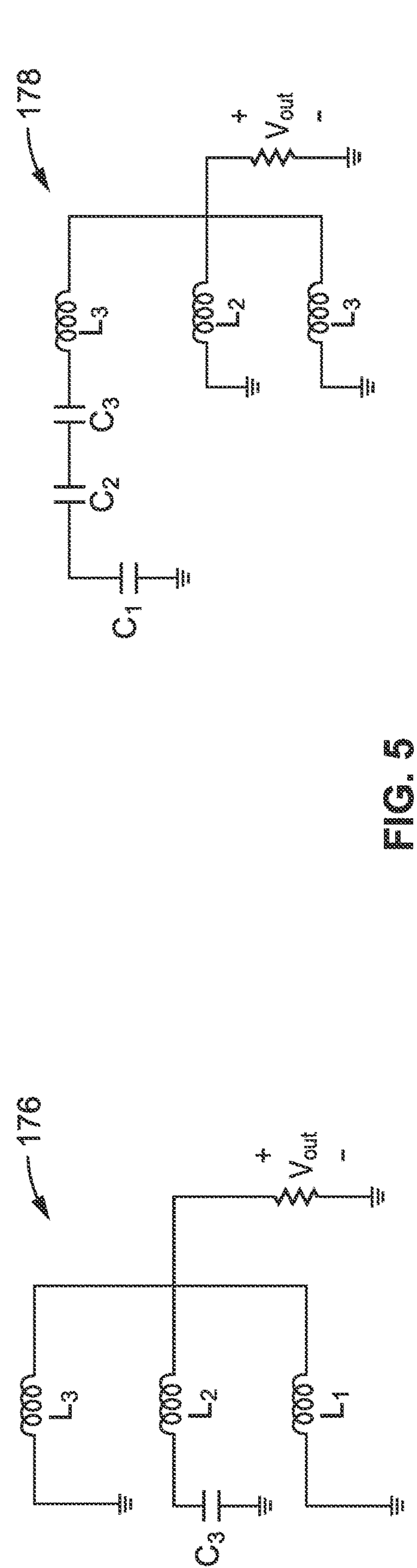

FIG. 5 illustrates an example of equivalent circuits 172, 174, 176, 178 and 180 for the 6-to-1 hybrid converter of FIG. 3.

Figure 6:
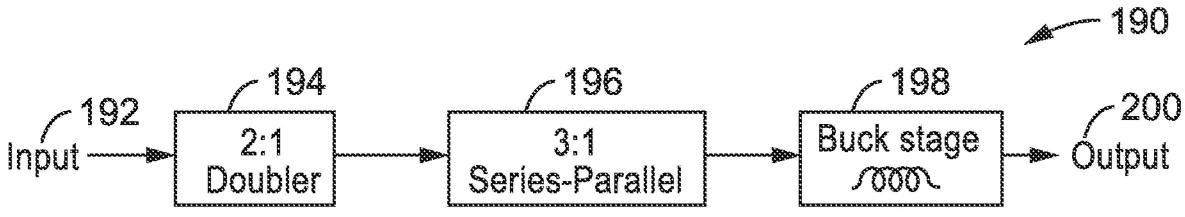
FIG. 6 is a block diagram of the 6-to-1 hybrid converter of FIG. 3, according to at least one embodiment of the present disclosure.

FIG. 6 illustrates an example embodiment 190 with a block diagram of the 6-to-1 converter example of FIG. 3. Input 192 is coupled to a 2:1 doubler 194, followed by a 3:1 series-parallel stage 196 which is merged with buck conversion 198, for example the three buck stages shown in FIG. 3 which are in parallel with interleaved operation. This converter generates output 200.

Figure 7:
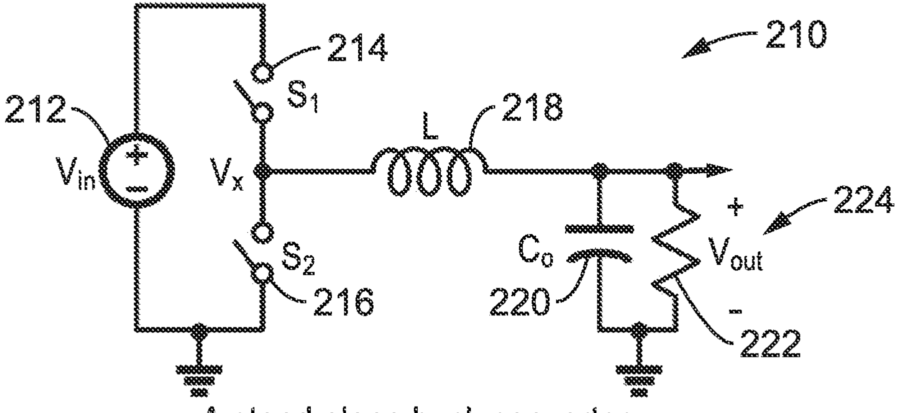
FIG. 7 is a schematic of a standalone buck converter, such as may be utilized according to at least one embodiment of the present disclosure.

FIG. 7 illustrates an example embodiment 210 of a standalone buck converter with input voltage source 212, switches 214, 216 in a totem-pole configuration to inductor 218 whose output 224 s directed to output capacitor 220 and load resistance 222.

Figure 8:
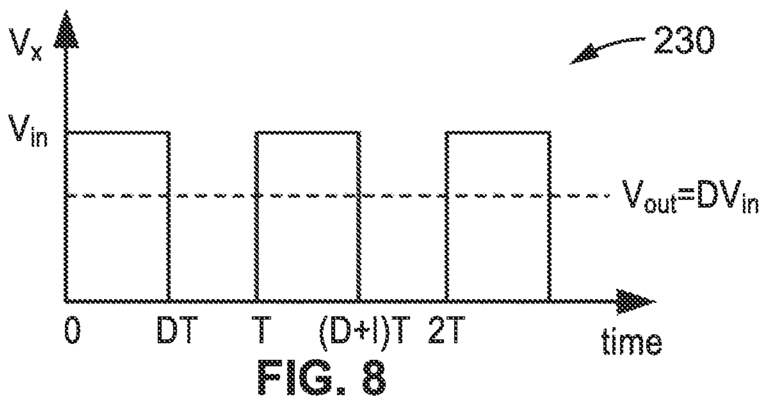
FIG. 8 is a plot of buck converter waveforms associated with FIG. 7, such as may be utilized according to at least one embodiment of the present disclosure.

FIG. 8 illustrates an example embodiment 230 of the voltage waveforms for the standalone buck converter of FIG. 7; showing Vin, voltage switching at $V_X$, and $V_{out}=DV_{in}$.

Figures 9, 10, 11:
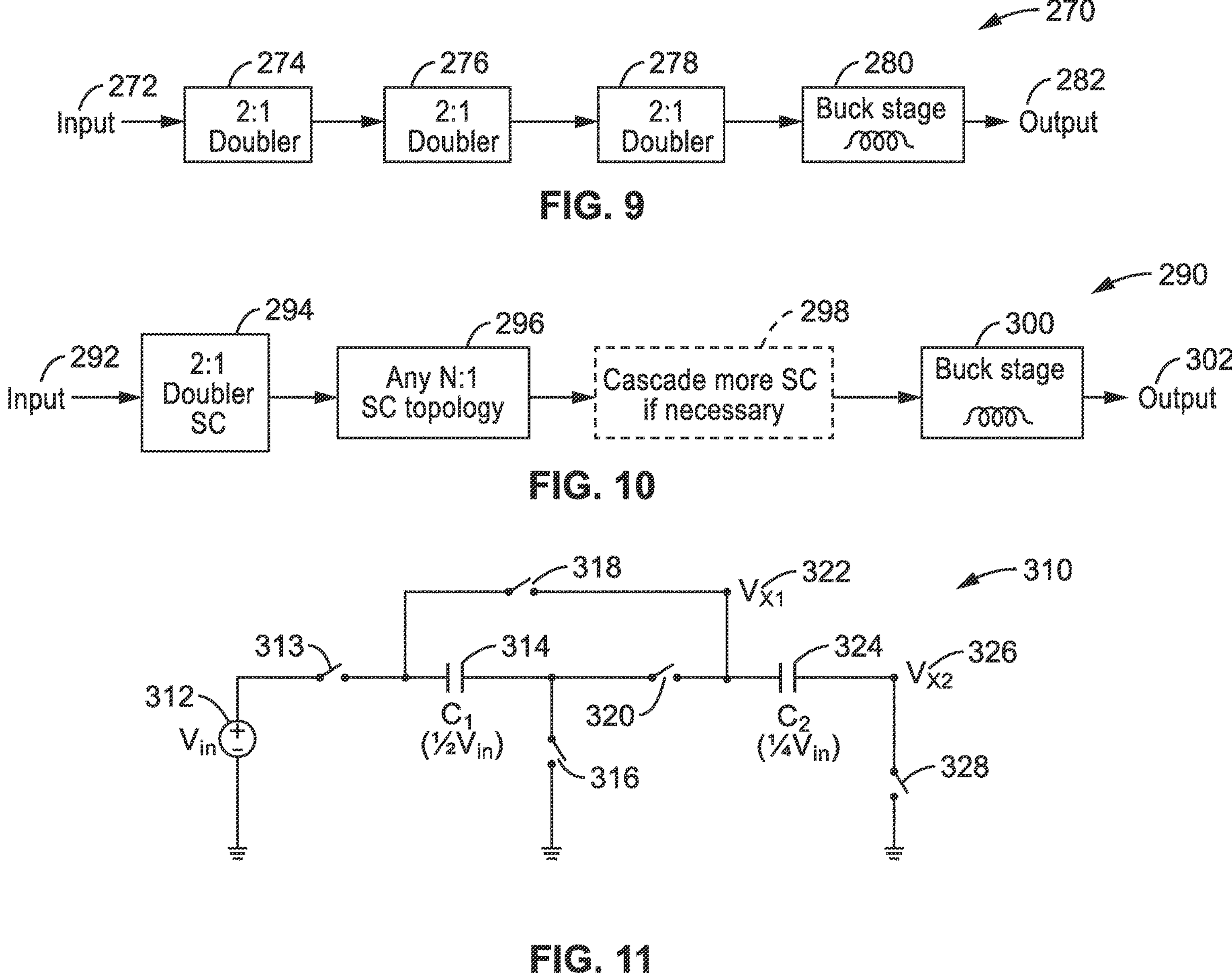
FIG. 9 is a block diagram of a 8-to-1 hybrid converter having three cascaded 2-to-1 doubler switched-capacitor sections, according to at least one embodiment of the present disclosure.
FIG. 10 is a block diagram of a generic hybrid converter structure according to at least one embodiment of the present disclosure.
FIG. 11 is a block diagram of a generic 4-to-1 hybrid converter according to at least one embodiment of the present disclosure.

FIG. 9 illustrates an example embodiment 270 of an 8-to-1 SC network having input 272 into three cascaded 2:1 doublers 274, 276 and 278, merged with a buck stage 280 to provide a single converter as a result using these multi-phase control signals, with output 282.

FIG. 10 illustrates an example embodiment 290 of a generic structure of the present disclosure for multi-phase hybrid power conversion for providing large conversion ratios. Input voltage 292 reaches a SC 2:1 doubler circuit 294, which is followed by any N:1 SC topology (circuit) 296, followed by an optional cascade(s) 298 of more SC circuits which are then merged to a buck conversion section 300, whose outputs are combined at output 302. It will be noted that the maximum number of inductors in the buck stage is determined by the number of phases/states in the prior SC network.

FIG. 11 illustrates an example 310 of an 4-to-1 fixed ratio SC converter (without a merged SL stage for voltage regulation), the theoretical minimum number of components is 10 switches and 3 flying capacitors. Along a direct (through) path, input 312 is directed through switch 313 to capacitor 314 ($C_1$) through switch 320 where voltage is $V_{X1}$ 322, to capacitor 324 ($C_2$) to output $V_{X2}$ 326. A second path segment arises when switches 316, 316 are activated to bypass capacitor 314 ($C_1$). A grounding switch 328 is seen at the output.

It will be noted that in this simplest 4-to-1 case, two switch nodes (Vx) can generate Vin/4.

$$V_{X1}: \begin{cases} V_{in} - V_{C1} - V_{C2}; \\ V_{C1} - V_{C2}; \end{cases}$$

-continued $$V_{X1}: \begin{cases} V_{C2}; \\ V_{C2}; \end{cases}$$

It should be noted that because of multiphase operation the low-voltage capacitors need to conduct for a longer time. In this 4-to-1 case, $C_2$ needs to conduct for twice the amount of time as $C_1$.

In comparison with the disclosed hybrid converter, such as shown in FIG. 1, the total switch and capacitor number remains the same, but the output side has a merged buck stage (two-phase interleaved inductors) for voltage regulation which comprises a multilevel doubler and provides a regulated hybrid converter with 8-to-1 SC stage.

The following examples provide additional embodiments of the technology.

Figure 12:
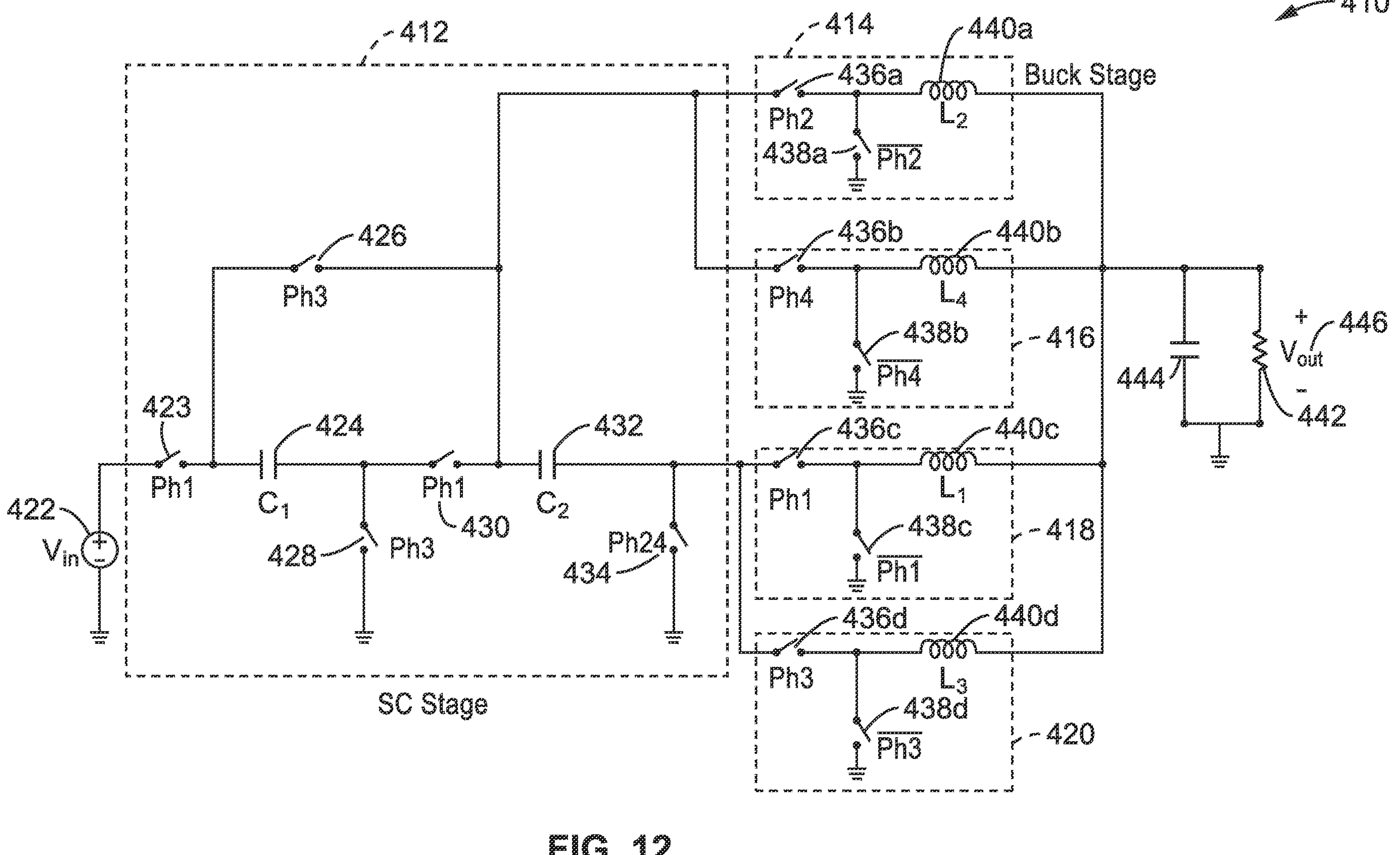
FIG. 12 is a schematic of a 4-to-1 converter having multiple (e.g., four) buck sections with associated inductors, according to at least one embodiment of the present disclosure.

FIG. 12 illustrates an example embodiment 410 of a 4-to-1 hybrid SC converter having an SC stage 412, and four inductors in its buck section, one in each of four stages 414, 416, 418 and 420. Along a direct (through) path, input 422 is directed through switch 423 (controlled by Ph1) to capacitor 424 ($C_1$) through switch 430 (controlled by Ph1) to capacitor 432 ($C_2$) and into the buck stages. The direct path can be altered as follows. A second path segment arises when switches 426 and 428 are active (controlled by Ph3) to bypass capacitor 424 ($C_1$). A grounding switch 434 (controlled by Ph24) is seen for grounding the output of capacitor 432 ($C_2$).

The upper two buck stages shown in the figure receive their input at the positive side (input) of capacitor 432 ($C_2$). The input is received at first buck stage through switch 436*a* (controlled by Ph2), which can be grounded by switch 438*a* (controlled by an inverted Ph2), to inductor 440*a* ($L_2$) and out to the output 446.

The input is received at the second buck stage through switch 436*b* (controlled by Ph4), which can be grounded by switch 438*b* (controlled by an inverted Ph4), to inductor 440*b* ($L_4$) and out to the output 446.

The lower two buck stages of the figure receive input from after capacitor 432 ($C_2$). The input is received at this third buck stage and through switch 436*c* (controlled by Ph1), which can be grounded by switch 438*c* (controlled by an inverted Ph1), to inductor 440*c* ($L_1$) and out to the output 446. Similarly, the input is received at the buck stage depicted at the bottom of this section through switch 436*d* (controlled by Ph3), which can be grounded by switch 438*d* (controlled by an inverted Ph3), to inductor 440*b* ($L_3$) and out to the output 446.

The output 446 is shown with capacitor 444 in parallel with load resistance 442.

Figure 13:
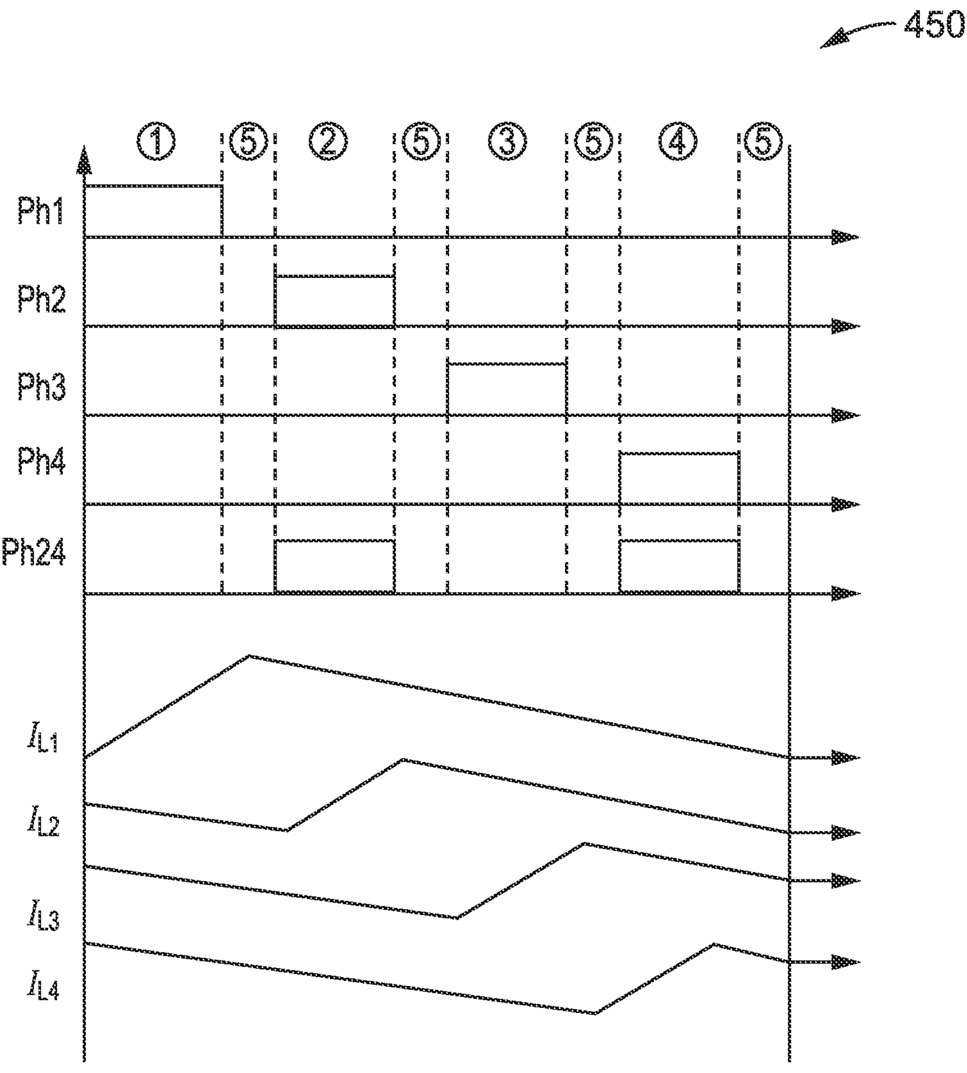
FIG. 13 are waveform plots for the 4-to-1 converter of FIG. 12, utilized according to at least one embodiment of the present disclosure.

FIG. 13 illustrates an example embodiment 450 of waveforms for the 4-to-1 hybrid SC converter of FIG. 12, showing 5 states, with state 5 being a "freewheeling" state performed following the principle circuit states. It should be noted that Ph1, Ph2, Ph3, Ph4, Ph24 are names of the control signals, which need not directly correlate to the five operating states of this converter. For this topology, the freewheeling in state 5 corresponds to when any of the inverted signals are active, and thus provides continuous output voltage regulation in the buck stage. In relation to the N-to-1 multi-phase SC network, the final hybrid topology with the merged SL network has this additional "freewheeling" state after each of the N main operating phases/states. During this state, the "non-output" side of all inductors are connected to ground. The figure also shows the level of inductor current through inductors $I_{L1}$ through $I_{L4}$.

This 4-to-1 example with 4 inductors is an example of the assertion that the maximum number of output inductors in the buck stages of the buck section is N, which is equal to the conversion ratio of the multi-phase SC stage.

Figure 14:
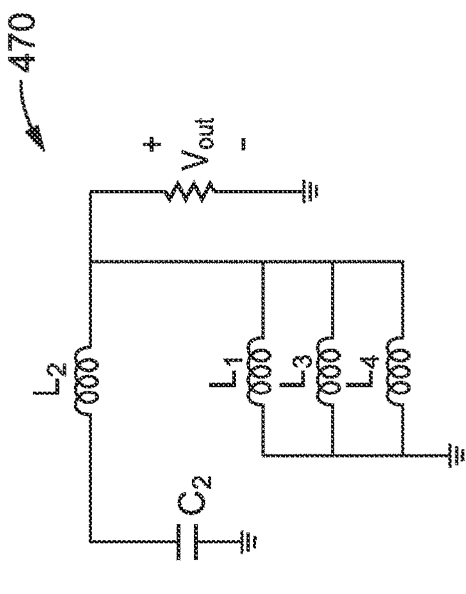
FIG. 14 are schematics of equivalent circuits for each phase of the 4-to-1 converter of FIG. 12, as utilized according to at least one embodiment of the present disclosure.
Figure 14:
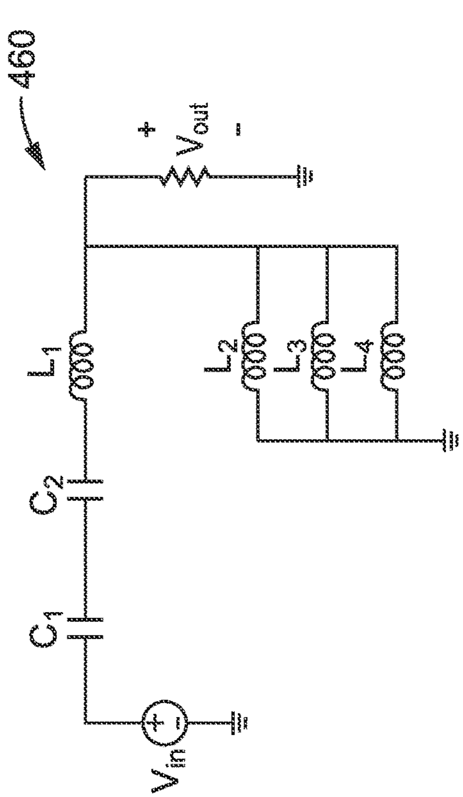
Figure 14:
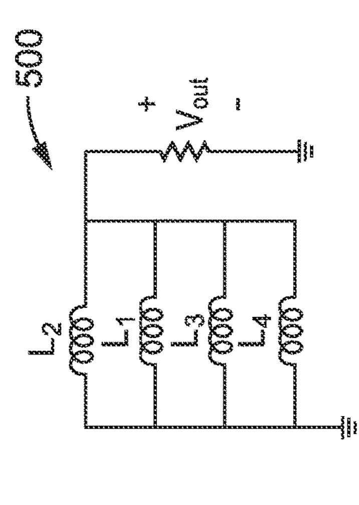
Figure 14:
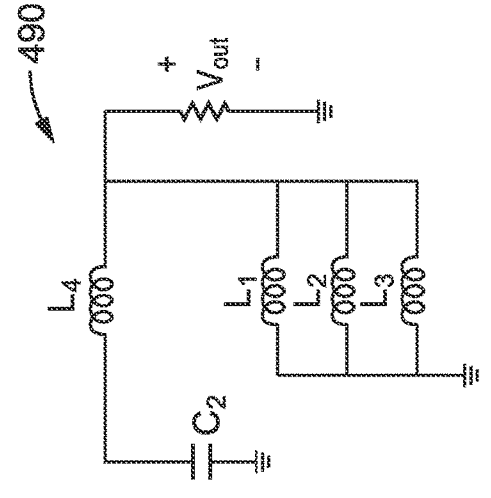
Figure 14:
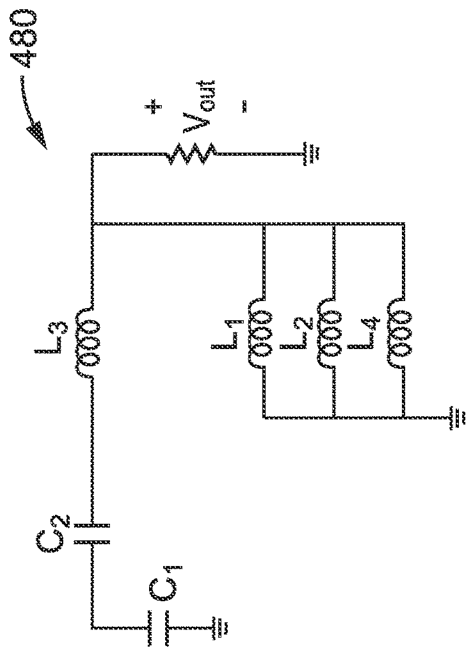

FIG. 14 illustrates equivalent circuits 460, 470, 480, 490 and 500 for the phases of the 4-to-1 hybrid SC converter of FIG. 12.

Figure 15:
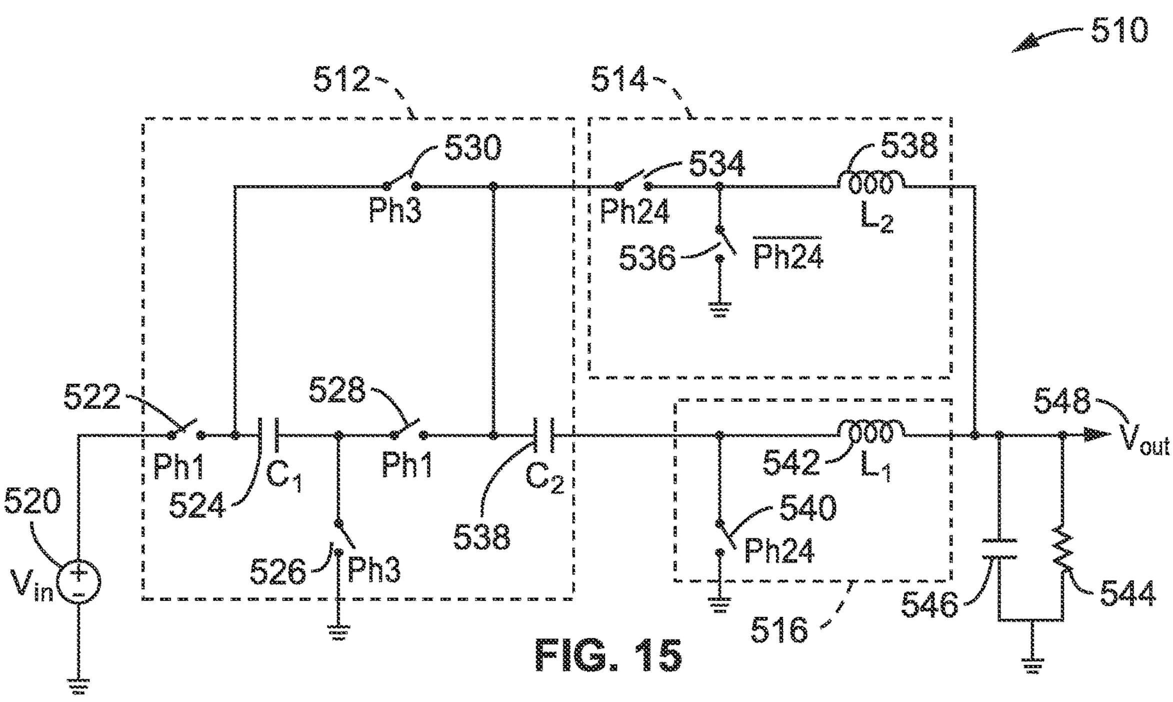
FIG. 15 is a schematic of a second version of the 4-to-1 converter having two buck sections with associated inductor, according to at least one embodiment of the present disclosure.

FIG. 15 illustrates an example embodiment 510 of a second version of the 4-to-1 converter, which in this embodiment has a 4-to-1 SC stage 512 and uses two inductors in the buck stage; one in each of two stages 514 and 516. Input 520 is directed along a direct (through) path through switch 522 (controlled by Ph1) to capacitor 524 ($C_1$), then through switch 528 (controlled by Ph1) to capacitor 538 ($C_2$) and into the buck stages. Then a second path segment arises when switch 526, 530, (controlled by Ph3) are active to bypass capacitor 524 ($C_1$).

The first of the two buck stages, buck stage 514, has its input connected at the positive side (input) of capacitor 524 ($C_1$) through switch 530, or from capacitor 538 ($C_2$) if switch 530 is open, to switch 534 (controlled by Ph24) to inductor 538 ($L_2$). A grounding switch 536 (controlled by an inverted Ph24) is shown between switch 534 and inductor 538.

The second of the two buck stages, buck stage 516, has its input connected from the negative side (output) of capacitor 538 ($C_2$), which can be grounded by switch 540 (controlled by Ph24), coupled to inductor 542 ($L_1$).

Outputs from the buck stages are combined as output 548 to a load resistance 544 and capacitance 546. The maximum gain is $1/4 * 1/2 = 1/8$.

Figure 16:
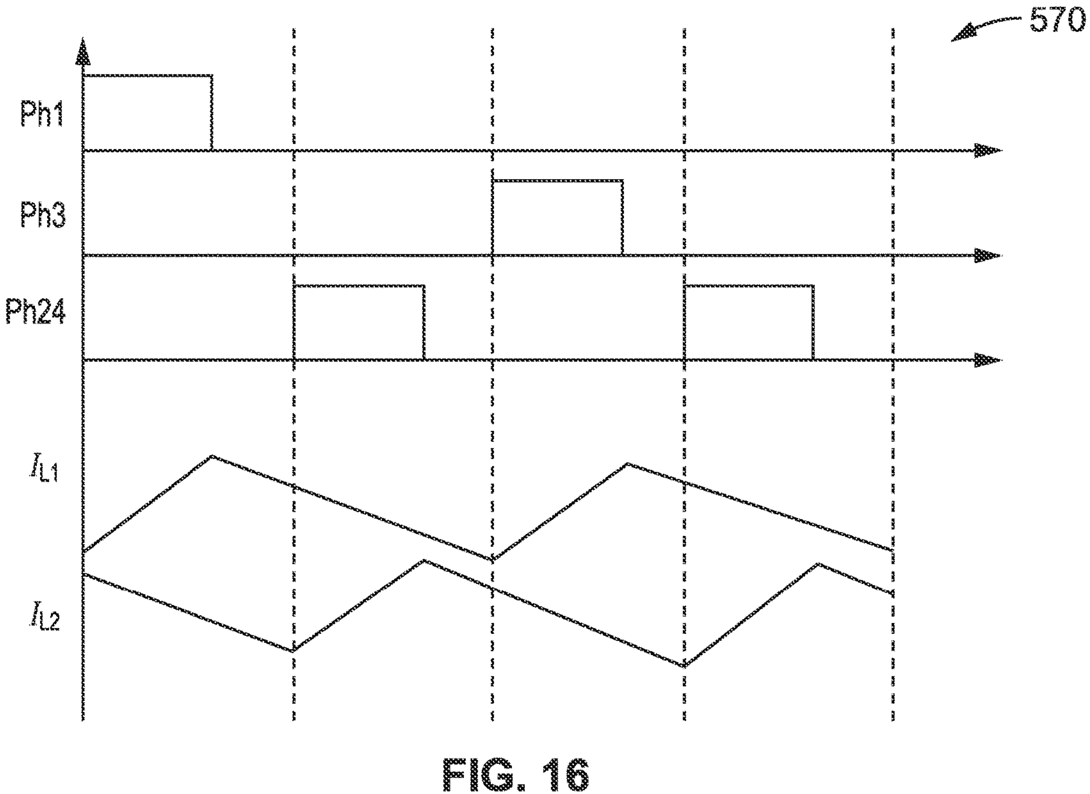
FIG. 16 are waveforms plots for the 4-to-1 converter of FIG. 15, according to at least one embodiment of the present disclosure.

FIG. 16 illustrates an example embodiment 570 of the associated phase waveforms for FIG. 15; showing Phase 1, Phase 3 and Phase 2+4 (Ph 24), as well as the current flow $I_{L1}$ and $I_{L2}$ through the buck stage inductors.

The above 4-to-1 example with two inductors illustrates that the number of output inductors can also be configured to N/2. In this case, the effective operating frequency of each inductor is doubled compared to the fundamental switching frequency of the front-end 2-to-1 SC stage (e.g., the 6-to-1 example in FIG. 3.)

Figure 17:
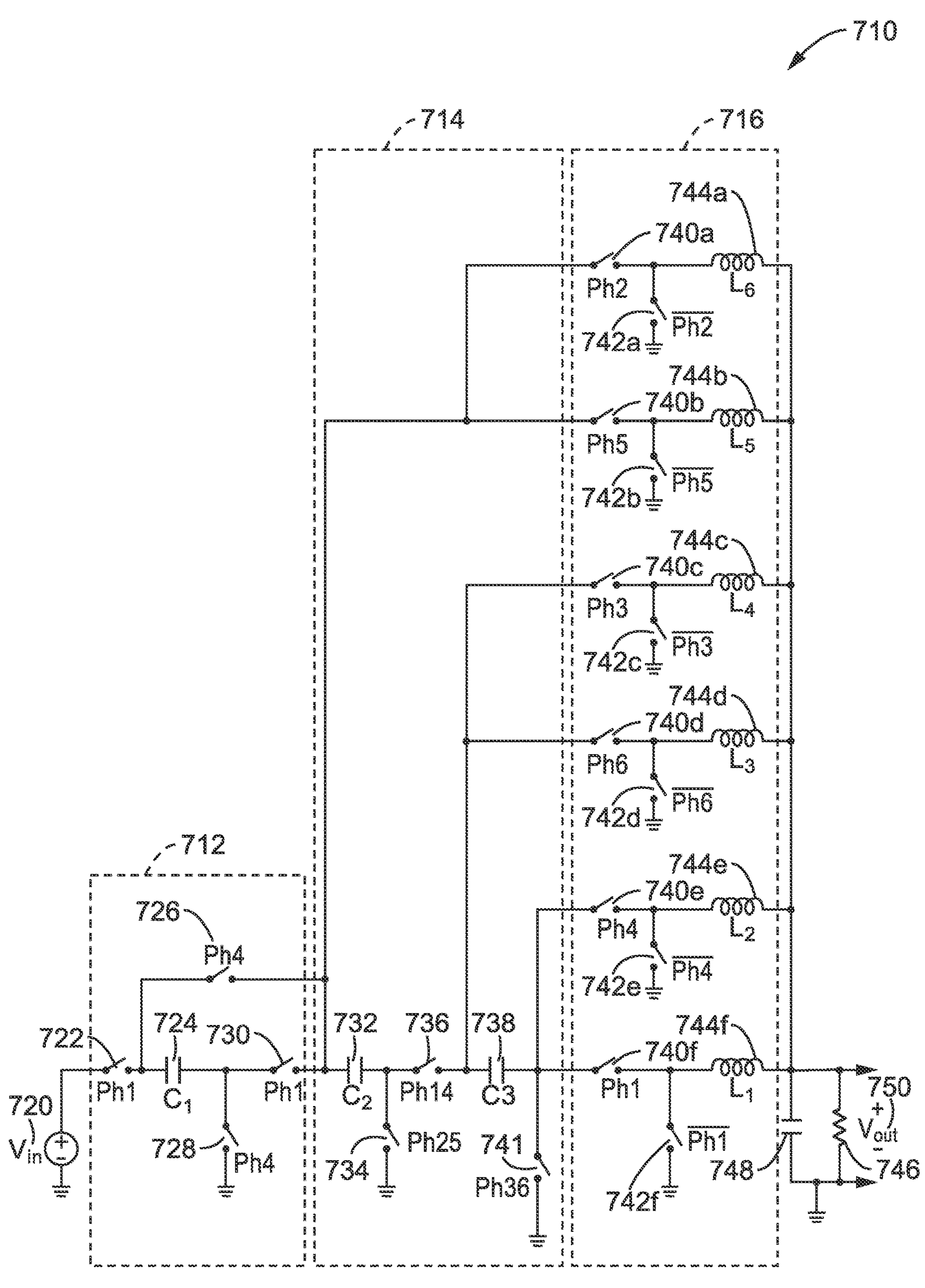
FIG. 17 is a schematic of an alternative 6-to-1 converter having multiple (e.g., six) buck sections with associated inductor according to at least one embodiment of the present disclosure.

FIG. 17 illustrates an example embodiment 710 of another 6-to-1 variant shown with a 6 phase buck stage. A doubler 712 forms the first SC stage then a 3-to-1 series-parallel is the $2^{nd}$ stage 714 which couples to a 6 phase buck section 716. The maximum gain of this converter is seen to be $1/6 * 1/6 = 1/36$. It should be noted that this 6-to-1 example with 6 inductors provides a clear example that the maximum number of output inductors in the buck stages is N, which is equal to the conversion ratio of the multi-phase SC stage.

Input 720 is directed along a direct (through) path going through switch 722 (controlled by Ph1) to capacitor 724 ($C_1$), then through switch 730 (controlled by Ph1) to capacitor 732 ($C_2$), then through switch 736 (controlled by Ph14) to capacitor 738 ($C_3$). The direct path can be altered as follows. A second path arises when switches 726 and 728 are active (as controlled by Ph4) to bypass capacitor 724 ($C_1$). A grounding switch 734 (controlled by Ph25) is also seen for grounding the output of capacitor 732 ($C_2$); while another grounding switch 741 (controlled by Ph36) is seen for grounding the output of capacitor 738 ($C_3$), each respectively altering the signals to the buck stages.

Six buck stages are seen. The upper two stages shown receive input from the input of capacitor 732 ($C_2$). The input to the top-most buck stage passes through switch 740*a* (controlled by Ph2), then can be grounded by switch 742*a* (controlled by an inverse of Ph2), before the current reaches inductor 744*a* ($L_6$) and is output. Then the next buck stage is seen with switch 740*b* (controlled by Ph5), grounding switch 742*b* (controlled by an inverted Ph5), and inductor 744*b* ($L_5$).

The middle two buck stages are shown receiving input from the input of capacitor 738 ($C_3$). These stages are similarly configured as above: switch 740*c* (controlled by Ph3), grounding switch 742*c* (controlled by an inverted Ph3), and inductor 744*c* ($L_4$); switch 740*d* (controlled by Ph6), grounding switch 742*d* (controlled by an inverted Ph6), and inductor 744*d* ($L_3$).

The lower two buck stages receive their input from the negative side (output) of capacitor 738 ($C_3$); switch 740*e* (controlled by Ph4), grounding switch 742*e* (controlled by an inverted Ph4), and inductor 744*e* ($L_2$); switch 740*f* (controlled by Ph1), grounding switch 742*f* (controlled by an inverted Ph1), and inductor 744*f* ($L_1$).

The outputs from the buck stages are combined (merged) as output 750 into capacitance 748 and load resistance 746.

Figure 18:
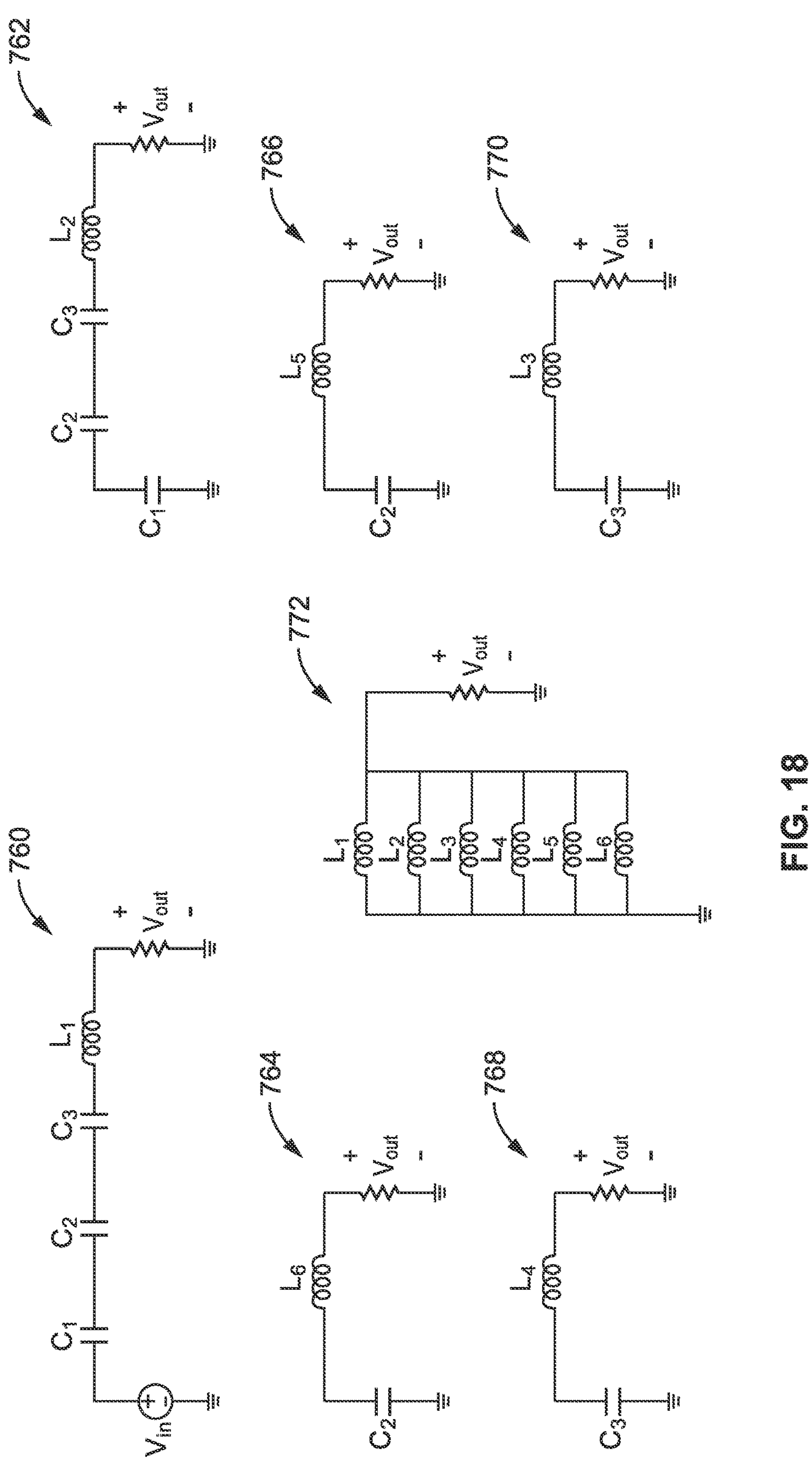
FIG. 18 depicts schematics of equivalent circuits for phases of the 6-to-1 converter of FIG. 17, as utilized according to at least one embodiment of the present disclosure.

FIG. 18 illustrates equivalent circuits 760, 762, 764, 766, 768 and 770 for the 6-to-1 hybrid converter of FIG. 18. It will be noted that 772 depicts the free-wheeling state for this converter embodiment.

Figure 19:
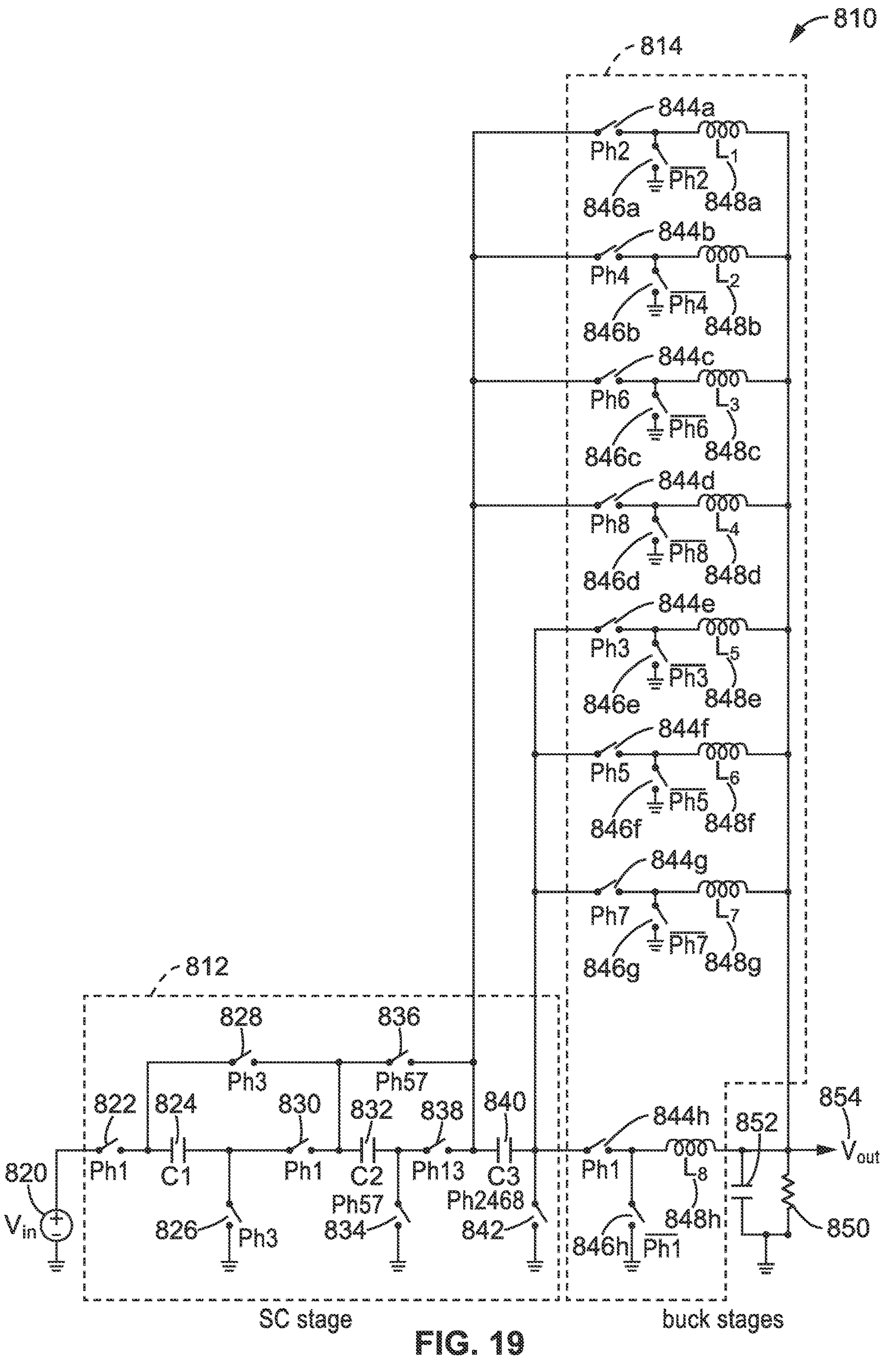
FIG. 19 is a schematic of an 8-to-1 converter having multiple (e.g., eight) buck sections with associated inductors, according to at least one embodiment of the present disclosure.

FIG. 19 illustrates an example embodiment 810 of another 8-to-1 variant shown with an SC stage 812 having three cascaded doublers and an 8 stage buck section 814. It will be noted that this 8-to-1 example with 8 inductors is a clear example that the maximum number of output inductors of the buck section is N, which is equal to the conversion ratio of the multi-phase SC stage.

Input 820 is directed on a direct path through switch 822 (controlled by Ph1) to capacitor 824 ($C_1$), then through switch 830 (controlled by Ph1) to capacitor 832 ($C_2$), then through switch 838 (controlled by Ph13) to capacitor 840 ($C_3$). The direct path can be altered as follows. A second path segment arises when switches 826 and 828 are active (controlled by Ph3) to bypass capacitor 824. Similarly, a third path segment arises when switches 834 and 836 are active (controlled by Ph57) to bypass capacitor 832. Grounding switch 842 (controlled by Ph2468) grounds the output of capacitor 840 ($C_3$).

There are eight buck stages. The upper four stages shown receive input from the positive side (input) of capacitor 840 ($C_3$), while the remaining four stages receive input from the output of capacitor 840 ($C_3$). These 8 stages each have a series switch 844*a* through 844*h* (controlled by Ph2, Ph4, Ph6, Ph8, Ph3, Ph5, Ph7 and Ph1, respectively), and grounding switches 846*a* through 846*h* (using the complements of the above phases), and passing current into inductor 848*a* through 848*h* ($L_1$ through $L_8$). The outputs from the buck stages are combined (merged) as output 854 into capacitance 852 and load resistance 850.

Figure 20:
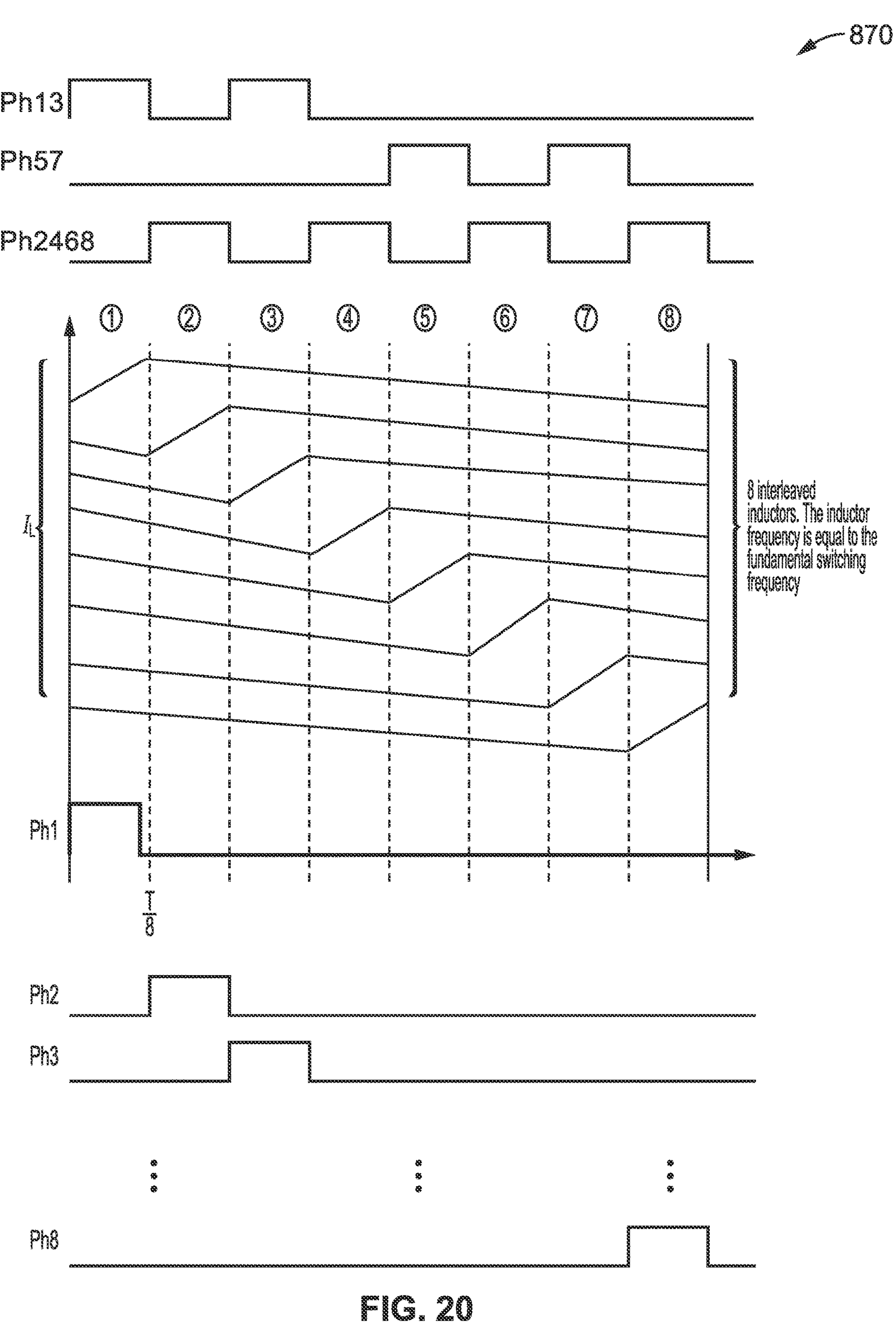
FIG. 20 are waveforms plots of the 8-to-1 converter of FIG. 19, utilized according to at least one embodiment of the present disclosure.

FIG. 20 illustrates waveforms 870 for the 8-to-1 variant of FIG. 19, and also showing inductor currents and multi-phase signals.

Figure 21:
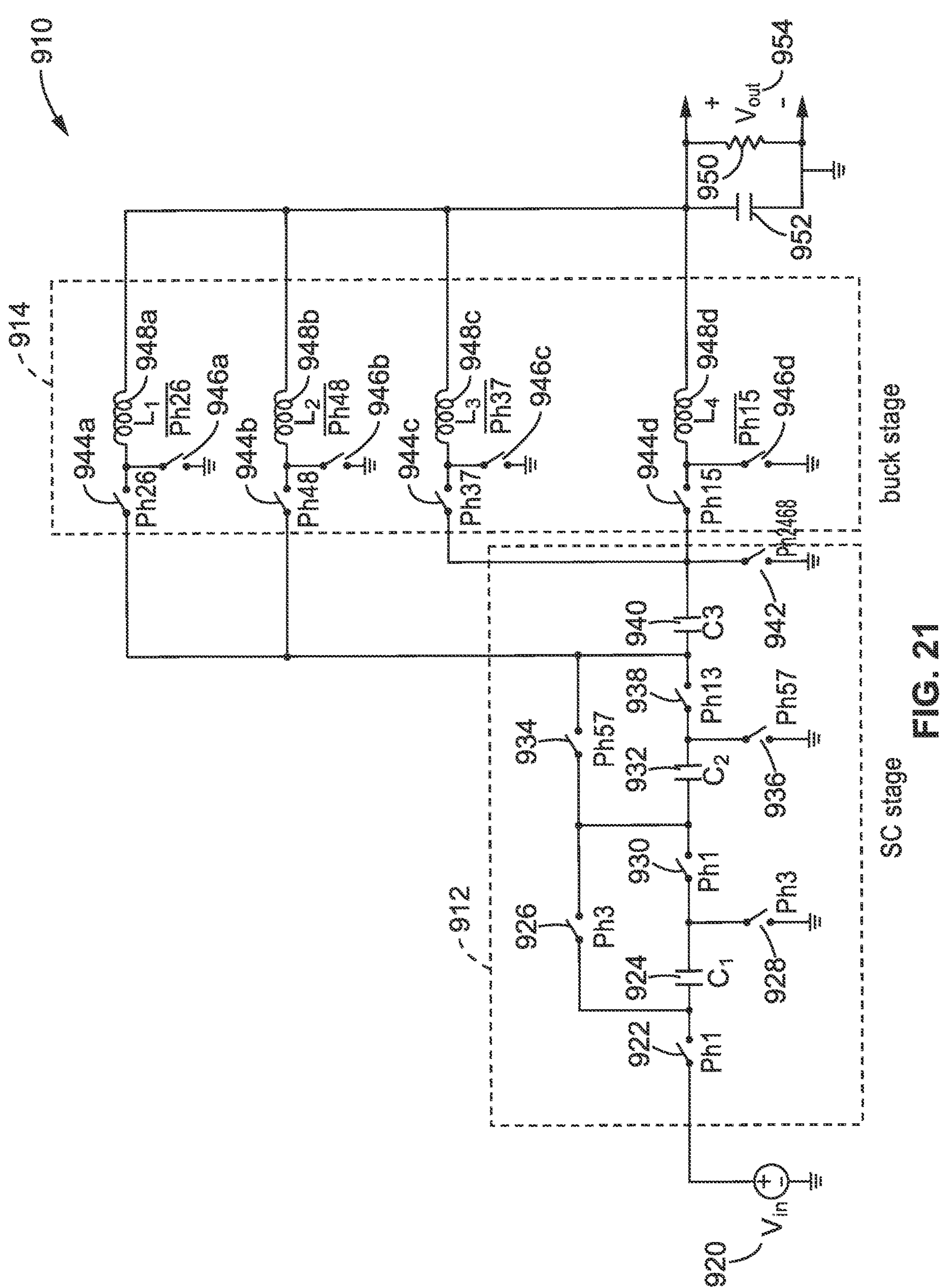
FIG. 21 is a schematic of another 8-to-1 converter having four inductors in its buck sections, as utilized according to at least one embodiment of the present disclosure.

FIG. 21 illustrates an example embodiment 910 of another 8-to-1 variant shown with a four inductor buck stage. The maximum gain is seen to be ⅛(SC)*¼(Buck Duty)=1/32. This 8-to-1 example with 4 inductors provides a clear example that the number of output inductors can also be configured to N/2. In this case, the effective operating frequency of each inductor is doubled compared to the fundamental switching frequency of the front-end 2-to-1 SC stage (e.g., the 6-to-1 example in FIG. 3).

Input 920 is directed on a direct path through switch 922 (controlled by Ph1) to capacitor 924 ($C_1$), then through switch 930 (controlled by Ph1) and capacitor 932 ($C_2$), then through switch 938 (controlled by Ph13) to capacitor 940 ($C_3$). The direct path can be altered by the interstage switching to bypass the capacitors. A second path segment arises when switch 926 and 928 (controlled by Ph3) are active to bypass capacitor 932 ($C_2$). Similarly, a third path segment arises when switch 934 and 936 (controlled by Ph57) are active to bypass capacitor 932. Grounding switch 942 (controlled by Ph2468) is also shown for grounding the output of capacitors 940 ($C_3$) in controlling the buck stages.

Four buck stages are seen. The upper two stages receive input from preceding capacitor 940 ($C_3$), while the remaining stages receive input from the output of capacitor 940. Each stage has a series switch 944*a* through 944*d* (controlled by Ph26, Ph48, Ph37 and Ph15, respectively), grounding switch 946*a* through 946*d* (controlled by inverses of Ph26, Ph48, Ph37 and Ph15, respectively), to inductors 948*a* through 948*d* ($L_1$-$L_4$). Switching of $L_1$ uses Ph26 and its complement, $L_2$ uses Ph48 and its complement, $L_3$ uses Ph37 and its complement, while $L_4$ uses Ph15 and its complement. The outputs from the buck stages are combined (merged) as output 954 into capacitance 952 and load resistance 950.

Figure 22:
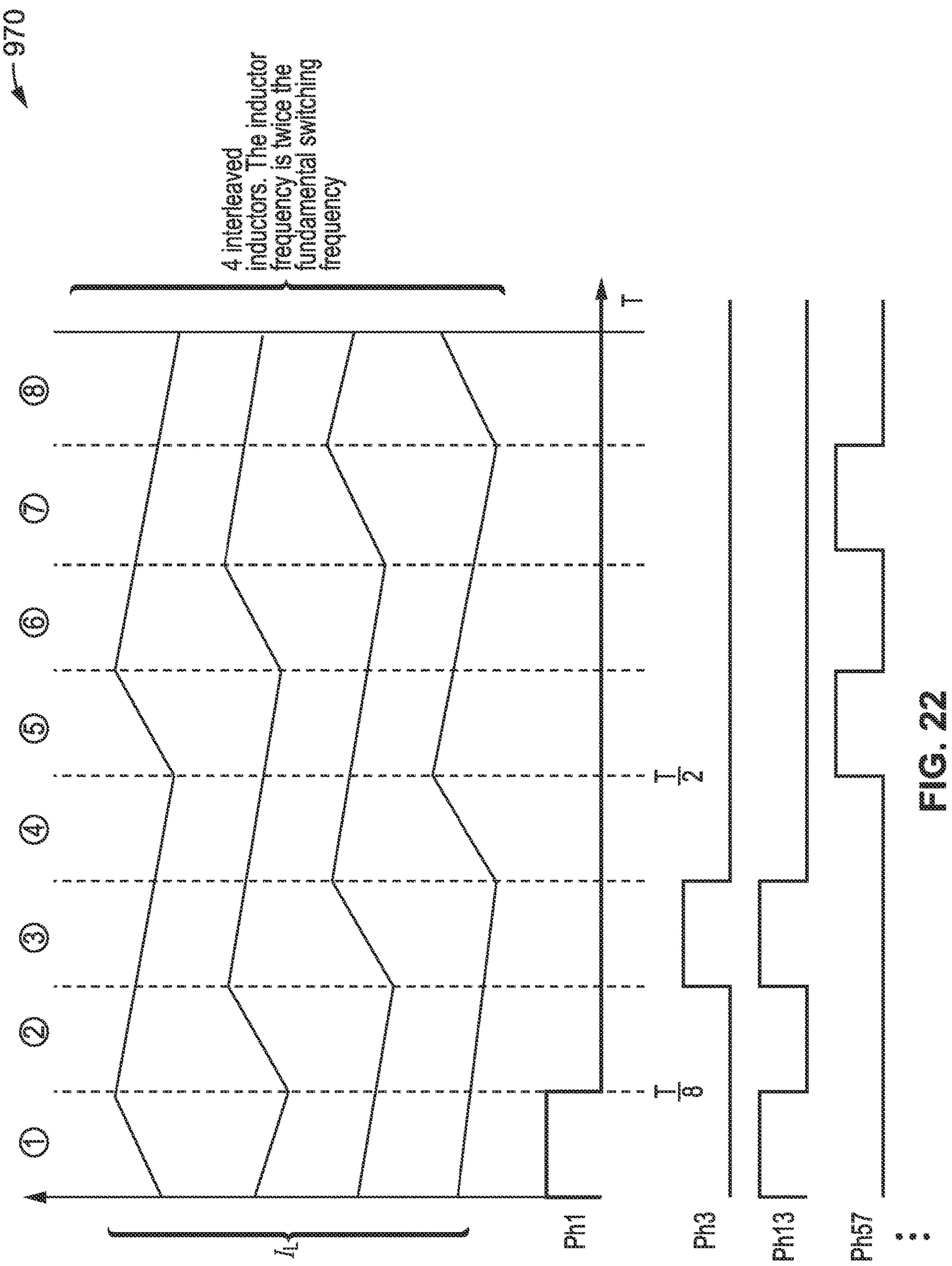
FIG. 22 are waveform plots for the 8-to-1 converter of FIG. 21, as utilized according to at least one embodiment of the present disclosure.

FIG. 22 illustrates example waveforms 970 showing inductor current and phase signal.

5. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

A DC-to-DC hybrid power converter apparatus, comprising: (a) a switched capacitor (SC) network merged with a switched inductor network, the combination configured for receiving a first DC voltage at its input and for outputting a second DC voltage at a given voltage gain, at its output; (a)(i) multiple flying capacitors in a series of capacitor stages, in which capacitors have at least two different voltage capacities as higher voltage capacitors and lower voltage capacitors; (a)(ii) switches at the input sides of each capacitor stage, and switches to ground one terminal of each capacitor stage, and switches for coupling between the inputs of the capacitor stages; (a)(iii) multiple inductors in a parallel connection of inductors, with inputs of the inductors coupled back to different capacitor stages; (a)(iv) switches coupling at least a portion of said inductors back to the different capacitor stages and inputs to the inductors to ground; (a)(v) outputs of the inductors are coupled together at the output of the hybrid power converter for driving an output load; (b) wherein said switched capacitor (SC) network merged with a switched inductor network is configured for being driven with multi-phase control signals to a combination of said switches within multiple states for the hybrid power converter, each cycle of which includes a freewheeling state for output voltage regulation where the current in said inductors ramps down; (c) wherein lower voltage capacitors of the SC network are charged/discharged for more time than the higher voltage capacitors of the SC network toward maintaining flying capacitor charge balance; and (d) wherein the final capacitor stages of said hybrid power converter are configured for being charged and discharged in a two phase operation which allows a buck converter to be directly cascaded to said hybrid power converter without requiring additional switches.

A DC-to-DC hybrid power converter apparatus, comprising: (a) a switched capacitor (SC) network merged with a switched inductor network, the combination configured for receiving a first DC voltage at its input and for outputting a second DC voltage, at a given voltage gain, at its output; (a)(i) multiple flying capacitors in a series of capacitor stages, in which capacitors have at least two different voltage capacities as higher voltage capacitors and lower voltage capacitors; (a)(ii) switches at the input sides of each capacitor stage, and switches to ground one terminal of each capacitor stage, and switches for coupling between the inputs of the capacitor stages; (a)(iii) multiple inductors in a parallel connection of inductors, with inputs of the inductors coupled back to different capacitor stages; (a)(iv) switches coupling at least a portion of said inductors back to the different capacitor stages and inputs to the inductors to ground; (a)(v) outputs of the inductors are coupled together at the output of the hybrid power converter for driving an output load; (b) wherein said switched capacitor (SC) network merged with a switched inductor network is configured for being driven with multi-phase control signals to a combination of said switches within multiple states for the hybrid power converter, each cycle of which includes a freewheeling state for output voltage regulation where the current in said inductors ramps down; (c) wherein lower voltage capacitors of the SC network are charged/discharged for more time than the higher voltage capacitors of the SC network toward maintaining flying capacitor charge balance, and said multi-phase operation is configured for providing multiple charging and discharging states for said capacitors and performing soft-charging capacitor operations toward reducing capacitor charge sharing losses; (d) wherein the final capacitor stages of said hybrid power converter are configured for being charged and discharged in a two phase operation which allows a buck converter to be directly cascaded to said hybrid power converter without requiring additional switches; and (e) wherein said multi-phase control signals comprise at least 8 states in the 8-to-1 version, at least 6 states in the 6-to-1 version, and at least 4 states in the 4-to-1 version, in the conversion cycle with at least one freewheeling state within each of these group of states for output voltage regulation where the current in said inductors ramps down within each conversion cycle.

A method of DC-to-DC power conversion, comprising: (a) merging a switched capacitor (SC) network with a switched inductor network, the combination of which is configured for receiving a first DC voltage at its input and for outputting a second DC voltage at a given voltage gain, at its output; (b) coupling multiple flying capacitors in a series of capacitor stages, in which capacitors have at least two different voltage capacities as higher voltage capacitors and lower voltage capacitors; (c) coupling switches at the input to each capacitor stage, and switches to ground one terminal of each capacitor stage, and switches for coupling between the inputs of the capacitor stages; (d) coupling multiple inductors in a parallel connection of inductors, with inputs of the inductors coupled back to different capacitor stages; (e) coupling switches between at least a portion of said inductors back to the different capacitor stages and inputs to the inductors to ground; (f) coupling the outputs of said inductors together at the output of the power converter for driving an output load; (g) wherein said switched capacitor (SC) network merged with a switched inductor network is configured for being driven with multi-phase control signals to a combination of said switches within multiple states for the hybrid power converter, each cycle of which includes a freewheeling state for output voltage regulation where the current in said inductors ramps down; (h) wherein lower voltage capacitors of the SC network are charged/discharged for more time than the higher voltage capacitors of the SC network toward maintaining flying capacitor charge balance; and (i) wherein the final capacitor stages of said hybrid power converter are configured for being charged and discharged in a two phase operation which allows a buck converter to be directly cascaded to said hybrid power converter without requiring additional switches.

A DC-to-DC hybrid power converter apparatus, comprising: (a) a switched capacitor (SC) network merged with a switched inductor network, the combination configured for receiving a first DC voltage at its input and for outputting a second DC voltage, which is lower than said first DC voltage, at its output; (a)(i) multiple flying capacitors in a series of capacitor stages, in which capacitors have at least two different voltage capacities as higher voltage capacitors and lower voltage capacitors; (a)(ii) switches at the input sides of each capacitor stage, and switches to ground one terminal of each capacitor stage, and switches for coupling between the inputs of the capacitor stages; (a)(iii) multiple inductors in a parallel connection of inductors, with inputs of the inductors coupled back to different capacitor stages; (a)(iv) switches coupling at least a portion of said inductors back to the different capacitor stages and inputs to the inductors to ground; (a)(v) outputs of the inductors are coupled together at the output of the hybrid power converter for driving an output load; (b) wherein said switched capacitor (SC) network merged with a switched inductor network is configured for being driven with multi-phase control signals to a combination of said switches within multiple states for the hybrid power converter, each cycle of which includes a freewheeling state for output voltage regulation where the current in said inductors ramps down; (c) wherein lower voltage capacitors of the SC network are charged/discharged for more time than the higher voltage capacitors of the SC network toward maintaining flying capacitor charge balance; and (d) wherein the final capacitors stages of said hybrid power converter are configured for being charged and discharged in a two phase operation which allows a buck converter to be directly cascaded to said hybrid power converter without requiring additional switches.

The apparatus or method of any preceding implementation, wherein voltage gain from the SC stage is 4, 6, 8 times lower than said first DC voltage.

The apparatus or method of any preceding implementation, wherein said multi-phase control signals comprise at least 8 states in the 8-to-1 version, at least 6 states in the 6-to-1 version, and at least 4 states in the 4-to-1 version, in the conversion cycle with at least one freewheeling state within each of these group of states for output voltage regulation where the current in said inductors ramps down within each conversion cycle.

The apparatus or method of any preceding implementation, wherein said apparatus is configured to provide high conversion efficiency without the need of a large voltage conversion ratio at a second conversion stage.

The apparatus or method of any preceding implementation, wherein said multi-phase operation is configured to achieve higher conversion ratios in the SC network, while improving efficiency and power density.

The apparatus or method of any preceding implementation, wherein said multi-phase operation is configured for performing soft-charging capacitor operations toward reducing capacitor charge sharing losses.

The apparatus or method of any preceding implementation, wherein said multi-phase control signals provide multiple charging and discharging states for said capacitors.

The apparatus or method of any preceding implementation, wherein a maximum number of buck stage inductors that can be utilized is equal to the conversion ratio of the multi-phase SC stage.

The apparatus or method of any preceding implementation, wherein a number of buck stage inductors utilized is equal to the conversion ratio of the multi-phase SC stage divided by two or by four.

The apparatus or method of any preceding implementation, wherein said switches comprise transistor switches.

The apparatus or method of any preceding implementation, wherein said DC-to-DC hybrid power converter apparatus is bidirectional, and can be utilized for either voltage step-down in which voltage gain is less than one, or voltage step-up in which voltage gain is more than one, by swapping the input and output terminals.

The apparatus or method of any preceding implementation, wherein output voltage from the SC stage is 8 times lower than said first DC voltage.

The apparatus or method of any preceding implementation, wherein output voltage from the SC stage is 6 times lower than said first DC voltage.

The apparatus or method of any preceding implementation, wherein said multi-phase control signals comprise at least 8 states in the 8-to-1 version, at least 6 states in the 6-to-1 version, and at least 4 states in the 4-to-1 version, in the conversion cycle with at least freewheeling state within each of these group of states for output voltage regulation where the current in said inductors ramps down within each conversion cycle.

The apparatus or method of any preceding implementation, wherein said apparatus is configured to provide high conversion efficiency without the need of a large voltage conversion ratio at a second conversion stage.

The apparatus or method of any preceding implementation, wherein said multi-phase operation is configured to achieve higher conversion ratios in the SC network, while improving efficiency and power density.

Each and every embodiment of the technology described herein, as well as any aspect, component, or element of any embodiment described herein, and any combination of aspects, components or elements of any embodiment described herein.

As used herein, term “implementation” is intended to include, without limitation, embodiments, examples, or other forms of practicing the technology described herein.

As used herein, the singular terms “a,” “an,” and “the” may include plural referents unless the context clearly dictates otherwise. Reference to an object in the singular is not intended to mean “one and only one” unless explicitly so stated, but rather “one or more.”

Phrasing constructs, such as “A, B and/or C”, within the present disclosure describe where either A, B, or C can be present, or any combination of items A, B and C. Phrasing constructs indicating, such as “at least one of” followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A DC-to-DC hybrid power converter apparatus, comprising:

(a) a switched capacitor (SC) network, having input and output terminals, merged with a switched inductor network as buck stages having buck stage interleaving, to form a combination configured for receiving a first DC voltage at an input of the apparatus and for outputting a second DC voltage at a given voltage gain, at an output of the apparatus;

(i) multiple flying capacitors in a series of capacitor stages, having an initial capacitor stage and outputs from final capacitor stages, in which the flying capacitors have at least two different voltage capacities as higher voltage capacitors and lower voltage capacitors;

(ii) a first plurality of switches at input sides of each capacitor stage, and a second plurality of switches to ground one terminal of each capacitor stage, and a third plurality of switches for coupling between inputs of the capacitor stages;

(iii) multiple inductors in a parallel connection of inductors, with inputs of the inductors coupled back to different capacitor stages;

(iv) a fourth plurality of switches coupling at least a portion of said inductors back to the different capacitor stages and a fifth plurality of switches coupling between an input of each of the multiple inductors to ground;

(v) outputs of the inductors are coupled together at an output of the hybrid power converter for driving an output load;

(b) wherein said DC-to-DC hybrid power converter apparatus is configured for being driven with multi-phase control signals within each switching cycle to a combination of said first, second and third plurality of switches within multiple states for the hybrid power converter, each switching cycle of which includes at least one freewheeling state for output voltage regulation where current through said parallel connection of inductors ramps down; and wherein all inductors in the buck stages are energized and de-energized in an interleaving manner with symmetrical phase shifts;

(c) wherein the lower voltage capacitors of the SC network are charged/discharged for more time than the higher voltage capacitors of the SC network toward maintaining flying capacitor charge balance; and (d) wherein the final capacitor stages of said hybrid power converter are configured for being charged and discharged in a two phase operation in which the buck stage interleaving reduces switch component count.

2. The apparatus of claim 1, wherein voltage gain from the SC network is 4, 6, 8 times lower than said first DC voltage.

3. The apparatus of claim 1, wherein said multi-phase control signals comprise a group of at least 8 states in an 8-to-1 version, a group of at least 6 states in a 6-to-1 version, and a group of at least 4 states in a 4-to-1 version, in the multi-phase control signals with the at least one freewheeling state within each of these group of states for output voltage regulation where current through said parallel connection of inductors ramps down within each switching cycle.

4. The apparatus of claim 1, wherein said apparatus is configured to provide high conversion efficiency without requiring a large voltage conversion ratio at a second conversion stage.

5. The apparatus of claim 1, wherein said multi-phase operation is configured to achieve higher conversion ratios in the SC network, while improving efficiency and power density.

6. The apparatus of claim 1, wherein said multi-phase operation is configured for performing soft-charging capacitor operations toward reducing capacitor charge sharing losses.

7. The apparatus of claim 1, wherein said multi-phase control signals provide multiple charging and discharging states for said multiple flying capacitors.

8. The apparatus of claim 1, wherein a maximum number of buck stage inductors that can be utilized is equal to a conversion ratio of the SC network.

9. The apparatus of claim 1, wherein a number of buck stage inductors utilized is equal to a conversion ratio of the SC network divided by two or by four.

10. The apparatus of claim 1, wherein said first, second and third plurality of switches comprise transistor switches.

11. The apparatus of claim 1, wherein said DC-to-DC hybrid power converter apparatus is bidirectional, and can be utilized for either voltage step-down in which voltage gain is less than one, or voltage step-up in which voltage gain is more than one, by swapping the connections to the input and output terminals.

12. A DC-to-DC hybrid power converter apparatus, comprising:

(a) a switched capacitor (SC) network, having input and output terminals, wherein the SC network is merged with a switched inductor network, to form a combination configured for receiving a first DC voltage at an input of the apparatus and for outputting a second DC voltage, at a given voltage gain, at an output of the apparatus;

(i) multiple flying capacitors in a series of capacitor stages in the SC network with initial capacitor stages connected from the input terminal of the SC network and proceeding to final capacitor stages preceding the merge with the switched inductor network, wherein the flying capacitors have at least two different voltage capacities as higher voltage capacitors and lower voltage capacitors;

(ii) a first plurality of switches, each of which is connected to an input side of its respective capacitor in the series of capacitor stages, and a second plurality of switches, each of which is configured to ground one terminal of its respective capacitor stage, and a third plurality of switches for coupling between inputs of the series of the capacitor stages;

(iii) multiple inductors in a parallel connection of inductors, with inputs of the inductors coupled back to different capacitor stages;

(iv) a fourth plurality of switches coupling at least a portion of said inductors back to the different capacitor stages and a fifth plurality of switches coupling between an input of each of the multiple inductors to ground;

(v) outputs of the inductors are coupled together at an output of the hybrid power converter for driving an output load;

(b) wherein said DC-to-DC hybrid power converter apparatus is configured for being driven with multi-phase control signals within each switching cycle, within each switching cycle, to a combination of said first, second and third plurality of switches within multiple states for the hybrid power converter, each switching cycle of which includes at least one freewheeling state for output voltage regulation where current through said parallel connection of inductors ramps down;

(c) wherein the lower voltage capacitors of the SC network are charged/discharged for more time than the higher voltage capacitors of the SC network toward maintaining flying capacitor charge balance, and said multi-phase operation is configured for providing multiple charging and discharging states for said capacitors and performing soft-charging capacitor operations toward reducing capacitor charge sharing losses;

(d) wherein the final capacitor stages of said hybrid power converter are configured for being charged and discharged in a two phase operation which allows a buck converter to be directly cascaded to said hybrid power converter without requiring additional switches; and (e) wherein said multi-phase control signals comprise a group of at least 8 states in an 8-to-1 version, a group of at least 6 states a 6-to-1 version, and a group of at least 4 states in a 4-to-1 version, in the multi-phase control signals with the at least one freewheeling state within each of these group of states for output voltage regulation where current through said parallel connection of inductors ramps down within each switching cycle.

13. The apparatus of claim 12, wherein said apparatus is configured to provide high conversion efficiency without requiring a large voltage conversion ratio at a second conversion stage.

14. The apparatus of claim 12, wherein said multi-phase operation is configured to achieve higher conversion ratios in the SC network, while improving efficiency and power density.

15. The apparatus of claim 12, wherein a maximum number of buck stage inductors that can be utilized is equal to a conversion ratio of the SC network.

16. The apparatus of claim 12, wherein a number of buck stage inductors utilized is equal to a conversion ratio of the SC network divided by two or by four.

17. The apparatus of claim 12, wherein said first, second and third plurality of switches comprise transistor switches.

18. The apparatus of claim 12, wherein said DC-to-DC hybrid power converter apparatus is bidirectional, and can be utilized for either voltage step-down in which voltage gain is less than one, or voltage step-up in which voltage gain is more than one, by swapping the connections to the input and output terminals.

19. A method of DC-to-DC power conversion, comprising:

(a) merging a switched capacitor (SC) network with a switched inductor network, to form a combination as a hybrid power converter, configured for receiving a first DC voltage at an input terminal and for outputting a second DC voltage at a given voltage gain, at an output terminal;

(b) coupling multiple flying capacitors in a series of capacitor stages, having an initial capacitor stage and final capacitor stages, in which the flying capacitors have at least two different voltage capacities as higher voltage capacitors and lower voltage capacitors;

(c) coupling a first plurality of switches an input side to each capacitor stage, and a second plurality of switches to ground one terminal of each capacitor stage, and a third plurality of switches for coupling between inputs of the capacitor stages;

(d) coupling multiple inductors in a parallel connection of inductors, with inputs of the inductors coupled back to different capacitor stages;

(e) coupling, using a fourth plurality of switches, connecting at least a portion of said inductors back to the different capacitor stages, and a fifth plurality of switches coupling between an input of each of the multiple inductors to ground;

(f) coupling the outputs of said inductors together at the output of the power converter for driving an output load;

(g) wherein said switched capacitor (SC) network merged with the switched inductor network is configured for being driven with multi-phase control signals within each switching cycle, within each switching cycle, to a combination of said first, second and third plurality of switches within multiple states for the hybrid power converter, each switching cycle of which includes at least one freewheeling state for output voltage regulation where current through said parallel connection of inductors ramps down;

(h) wherein the lower voltage capacitors of the SC network are charged/discharged for more time than the higher voltage capacitors of the SC network toward maintaining flying capacitor charge balance; and (i) wherein the final capacitor stages of said hybrid power converter are configured for being charged and discharged in a two phase operation which allows a buck converter to be directly cascaded to said hybrid power converter without requiring additional switches.

20. The method of claim 19, wherein a maximum number of buck stage inductors that can be utilized is equal to a conversion ratio of the SC network.

* * * * *